United States Patent
Fisher et al.

(10) Patent No.: US 12,243,256 B2
(45) Date of Patent: *Mar. 4, 2025

(54) SYSTEMS AND METHODS TO CHECK-IN SHOPPERS IN A CASHIER-LESS STORE

(71) Applicant: STANDARD COGNITION, CORP., San Francisco, CA (US)

(72) Inventors: Jordan E. Fisher, San Francisco, CA (US); Warren Green, San Francisco, CA (US); Daniel L. Fischetti, San Francisco, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,427

(22) Filed: Nov. 6, 2023

(65) Prior Publication Data

US 2024/0070895 A1     Feb. 29, 2024

Related U.S. Application Data

(63) Continuation of application No. 18/089,503, filed on Dec. 27, 2022, now Pat. No. 11,810,317, which is a
(Continued)

(51) Int. Cl.
*G06T 7/70* (2017.01)
*G06F 3/14* (2006.01)
(Continued)

(52) U.S. Cl.
CPC ............... *G06T 7/70* (2017.01); *G06F 3/14* (2013.01); *G06N 3/08* (2013.01); *G06Q 10/087* (2013.01);
(Continued)

(58) Field of Classification Search
CPC .............. G06T 7/70; G06T 7/20; G06T 2207/10016; G06T 2207/20081; G06T 2207/20084;
(Continued)

(56) References Cited

U.S. PATENT DOCUMENTS 1,037,779 A    9/1912   Kusebauch
4,746,830 A    5/1988   Holland
(Continued)

FOREIGN PATENT DOCUMENTS

CA      2497795 A1    8/2006
CN    104850846 A     8/2015
(Continued)

OTHER PUBLICATIONS

Amazon, "Amazon Go Frequently Asked Questions", 4 pages. Retrieved on Feb. 23, 2022. Retrieved from the internet [URL: <https://www.amazon.com/b?node=16008589011>].
(Continued)

*Primary Examiner* — Mia M Thomas
(74) *Attorney, Agent, or Firm* — Haynes Beffel & Wolfeld LLP; Andrew L. Dunlap

(57) ABSTRACT

Systems and techniques are provided for linking subjects in an area of real space with user accounts. The user accounts are linked with client applications executable on mobile computing devices. A plurality of cameras are disposed above the area. The cameras in the plurality of cameras produce respective sequences of images in corresponding fields of view in the real space. A processing system is coupled to the plurality of cameras. The processing system includes logic to determine locations of subjects represented in the images. The processing system further includes logic to match the identified subjects with user accounts by identifying locations of the mobile computing devices executing client applications in the area of real space and
(Continued)

matching locations of the mobile computing devices with locations of the subjects.

19 Claims, 13 Drawing Sheets

Related U.S. Application Data continuation of application No. 17/383,303, filed on Jul. 22, 2021, now Pat. No. 11,538,186, which is a continuation of application No. 16/842,382, filed on Apr. 7, 2020, now Pat. No. 11,200,692, which is a continuation of application No. 16/255,573, filed on Jan. 23, 2019, now Pat. No. 10,650,545, which is a continuation-in-part of application No. 15/945,473, filed on Apr. 4, 2018, now Pat. No. 10,474,988, which is a continuation-in-part of application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/542,077, filed on Aug. 7, 2017.

(51) Int. Cl.
| | |
|---|---|
| *G06N 3/08* | (2023.01) |
| *G06Q 10/087* | (2023.01) |
| *G06Q 30/06* | (2023.01) |
| *G06Q 30/0601* | (2023.01) |
| *G06T 7/20* | (2017.01) |
| *G06V 20/52* | (2022.01) |
| *H04L 9/40* | (2022.01) |
| *H04L 65/612* | (2022.01) |
| *H04L 67/131* | (2022.01) |
| *H04L 67/306* | (2022.01) |
| *H04L 67/52* | (2022.01) |
| *H04N 23/60* | (2023.01) |
| *H04N 23/90* | (2023.01) |
| *H04W 4/00* | (2018.01) |
| *H04W 12/065* | (2021.01) |
| *G06N 3/04* | (2023.01) |

(52) U.S. Cl.
CPC ......... *G06Q 30/06* (2013.01); *G06Q 30/0633* (2013.01); *G06T 7/20* (2013.01); *G06V 20/52* (2022.01); *H04L 63/0853* (2013.01); *H04L 67/131* (2022.05); *H04L 67/306* (2013.01); *H04L 67/52* (2022.05); *H04N 23/60* (2023.01); *H04N 23/90* (2023.01); *H04W 4/00* (2013.01); *H04W 12/065* (2021.01); *G06N 3/04* (2013.01); *G06T 2207/10016* (2013.01); *G06T 2207/20081* (2013.01); *G06T 2207/20084* (2013.01); *H04L 65/612* (2022.05)

(58) Field of Classification Search
CPC ... G06F 3/14; G06N 3/08; G06N 3/04; G06N 3/0464; G06N 3/045; G06N 5/01; G06N 20/10; G06N 20/20; G06Q 10/087; G06Q 30/06; G06Q 30/0633; G06V 20/52; G06V 40/107; H04L 63/0853; H04L 67/131; H04L 67/306; H04L 67/52; H04L 65/612; H04N 23/60; H04N 23/90; H04W 4/00; H04W 12/065; H04W 4/021; H04W 4/029; H04W 4/33; H04W 4/80; H04W 12/02

See application file for complete search history.

(56) References Cited

U.S. PATENT DOCUMENTS

| | | | |
|---|---|---|---|
| 5,734,722 A | 3/1998 | Halpern | |
| 5,745,036 A | 4/1998 | Clare | |
| 6,154,559 A | 11/2000 | Beardsley | |
| 6,561,417 B1 | 5/2003 | Gadd | |
| 6,584,375 B2 | 6/2003 | Bancroft et al. | |
| 6,768,102 B1 | 7/2004 | Skoll | |
| 7,050,624 B2 | 5/2006 | Dialameh et al. | |
| 7,050,652 B2 | 5/2006 | Stanek | |
| 7,240,027 B2 | 7/2007 | McConnell et al. | |
| 7,693,757 B2 | 4/2010 | Zimmerman | |
| 7,742,623 B1 | 6/2010 | Moon et al. | |
| 8,009,863 B1 | 8/2011 | Sharma et al. | |
| 8,098,888 B1 | 1/2012 | Mummareddy et al. | |
| 8,219,438 B1 | 7/2012 | Moon et al. | |
| 8,261,256 B1 | 9/2012 | Adler et al. | |
| 8,279,325 B2 | 10/2012 | Pitts et al. | |
| 8,452,868 B2 | 5/2013 | Shafer et al. | |
| 8,577,705 B1 | 11/2013 | Baboo et al. | |
| 8,615,254 B2 * | 12/2013 | Jamtgaard | H04W 4/029 382/107 |
| 8,624,725 B1 | 1/2014 | MacGregor | |
| 8,749,630 B2 | 6/2014 | Alahi et al. | |
| 8,855,682 B2 * | 10/2014 | Osann, Jr. | H04W 4/48 455/418 |
| 8,897,741 B2 | 11/2014 | Johnson | |
| 9,033,229 B2 | 5/2015 | Matsuhisa et al. | |
| 9,036,028 B2 | 5/2015 | Buehler | |
| 9,058,523 B2 | 6/2015 | Merkel et al. | |
| 9,078,095 B2 * | 7/2015 | Johnson | H04W 40/20 |
| 9,124,778 B1 | 9/2015 | Crabtree | |
| 9,147,174 B2 | 9/2015 | Glickman et al. | |
| 9,171,442 B2 | 10/2015 | Clements | |
| 9,262,681 B1 | 2/2016 | Mishra | |
| 9,269,012 B2 * | 2/2016 | Fotland | G06V 40/103 |
| 9,269,093 B2 | 2/2016 | Lee et al. | |
| 9,294,873 B1 | 3/2016 | MacGregor | |
| 9,390,032 B1 | 7/2016 | Baldwin | |
| 9,449,233 B2 | 9/2016 | Taylor | |
| 9,489,623 B1 | 11/2016 | Sinyavskiy et al. | |
| 9,494,532 B2 | 11/2016 | Xie et al. | |
| 9,536,177 B2 | 1/2017 | Chalasani et al. | |
| 9,582,891 B2 | 2/2017 | Geiger et al. | |
| 9,595,127 B2 * | 3/2017 | Champion | G06V 40/171 |
| 9,652,751 B2 | 5/2017 | Aaron et al. | |
| 9,693,333 B2 | 6/2017 | Alles et al. | |
| 9,846,810 B2 | 12/2017 | Partis | |
| 9,881,221 B2 | 1/2018 | Bala et al. | |
| 9,886,827 B2 | 2/2018 | Schoner | |
| 9,911,290 B1 | 3/2018 | Zalewski et al. | |
| 9,912,647 B2 * | 3/2018 | Reece | H04W 12/08 |
| 10,055,853 B1 | 8/2018 | Fisher et al. | |
| 10,083,453 B2 | 9/2018 | Campbell | |
| 10,127,438 B1 | 11/2018 | Fisher et al. | |
| 10,133,933 B1 | 11/2018 | Fisher et al. | |
| 10,163,031 B2 * | 12/2018 | Shaw | G06V 20/52 |
| 10,165,194 B1 | 12/2018 | Baldwin | |
| 10,169,677 B1 | 1/2019 | Ren et al. | |
| 10,175,340 B1 | 1/2019 | Abari et al. | |
| 10,176,452 B2 | 1/2019 | Rizzolo et al. | |
| 10,192,408 B2 | 1/2019 | Schoner | |
| 10,202,135 B2 | 2/2019 | Mian et al. | |
| 10,210,603 B2 | 2/2019 | Venable et al. | |
| 10,210,737 B2 | 2/2019 | Zhao | |
| 10,217,120 B1 | 2/2019 | Shin et al. | |
| 10,235,726 B2 * | 3/2019 | Branscomb | H04L 63/107 |
| 10,242,393 B1 | 3/2019 | Kumar et al. | |
| 10,257,708 B1 | 4/2019 | Kamkar et al. | |
| 10,262,331 B1 | 4/2019 | Sharma et al. | |
| 10,282,720 B1 | 5/2019 | Buibas et al. | |
| 10,282,852 B1 | 5/2019 | Buibas et al. | |
| 10,332,089 B1 | 6/2019 | Asmi et al. | |
| 10,333,923 B2 * | 6/2019 | Johri | G06F 21/36 |
| 10,354,262 B1 | 7/2019 | Hershey et al. | |
| 10,373,322 B1 | 8/2019 | Buibas et al. | |
| 10,387,896 B1 | 8/2019 | Hershey et al. | |

(56) References Cited

U.S. PATENT DOCUMENTS

| | | |
|---|---|---|
| 10,389,944 B2 | 8/2019 | Ozluturk |
| 10,438,277 B1 | 10/2019 | Jiang et al. |
| 10,445,694 B2 | 10/2019 | Fisher et al. |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,515,518 B2 | 12/2019 | Cantley et al. |
| 10,529,137 B1 | 1/2020 | Black et al. |
| 10,535,146 B1 | 1/2020 | Buibas et al. |
| 10,580,099 B2 | 3/2020 | Branscomb et al. |
| 10,650,545 B2 | 5/2020 | Fisher et al. |
| 10,699,537 B1 | 6/2020 | Schoner |
| 10,776,926 B2 | 9/2020 | Shrivastava |
| 10,810,539 B1 | 10/2020 | Mohanty et al. |
| 10,846,996 B2 | 11/2020 | Schoner |
| 10,853,965 B2 | 12/2020 | Fisher et al. |
| 10,929,829 B1 | 2/2021 | Hazelwood et al. |
| 11,049,063 B2* | 6/2021 | Ali .................. G06Q 10/087 |
| 11,063,931 B2 | 7/2021 | Johri |
| 11,132,810 B2 | 9/2021 | Kume et al. |
| 11,250,376 B2 | 2/2022 | Fisher et al. |
| 11,301,684 B1 | 4/2022 | Kumar et al. |
| 11,526,893 B2 | 12/2022 | Poole |
| 11,538,186 B2 | 12/2022 | Fisher et al. |
| 2003/0078849 A1 | 4/2003 | Snyder |
| 2003/0107649 A1 | 6/2003 | Flickner et al. |
| 2004/0099736 A1 | 5/2004 | Neumark |
| 2004/0131254 A1 | 7/2004 | Liang et al. |
| 2005/0177446 A1 | 8/2005 | Hoblit |
| 2005/0201612 A1 | 9/2005 | Park et al. |
| 2006/0132491 A1 | 6/2006 | Riach et al. |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0282665 A1 | 12/2007 | Buehler et al. |
| 2008/0001918 A1 | 1/2008 | Hsu et al. |
| 2008/0159634 A1 | 7/2008 | Sharma et al. |
| 2008/0170776 A1 | 7/2008 | Albertson et al. |
| 2008/0181507 A1 | 7/2008 | Gope et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0307226 A1 | 12/2009 | Koster et al. |
| 2010/0021009 A1 | 1/2010 | Yao |
| 2010/0103104 A1 | 4/2010 | Son et al. |
| 2010/0138281 A1 | 6/2010 | Zhang et al. |
| 2010/0208941 A1 | 8/2010 | Broaddus et al. |
| 2010/0283860 A1 | 11/2010 | Nader |
| 2011/0141011 A1 | 6/2011 | Ashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0137256 A1 | 5/2012 | Lalancette et al. |
| 2012/0154604 A1 | 6/2012 | Chen et al. |
| 2012/0159290 A1 | 6/2012 | Pulsipher et al. |
| 2012/0206337 A1 | 8/2012 | Hildreth et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0060708 A1 | 3/2013 | Oskolkov et al. |
| 2013/0076898 A1 | 3/2013 | Philippe et al. |
| 2013/0142384 A1 | 6/2013 | Ofek |
| 2013/0156260 A1 | 6/2013 | Craig |
| 2013/0182114 A1 | 7/2013 | Zhang et al. |
| 2013/0201339 A1 | 8/2013 | Venkatesh |
| 2013/0235206 A1 | 9/2013 | Smith et al. |
| 2013/0337789 A1 | 12/2013 | Johnson |
| 2014/0089673 A1* | 3/2014 | Luna .................. H04L 63/0861 713/186 |
| 2014/0168477 A1 | 6/2014 | David |
| 2014/0188648 A1 | 7/2014 | Argue et al. |
| 2014/0207615 A1 | 7/2014 | Li et al. |
| 2014/0220888 A1* | 8/2014 | Shimshoni .............. H04B 5/77 455/41.1 |
| 2014/0222501 A1 | 8/2014 | Hirakawa et al. |
| 2014/0282162 A1 | 9/2014 | Fein et al. |
| 2014/0285660 A1 | 9/2014 | Jamtgaard et al. |
| 2014/0300736 A1 | 10/2014 | Reitinger et al. |
| 2014/0304123 A1 | 10/2014 | Schwartz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0017972 A1 | 1/2015 | Osann, Jr. |
| 2015/0019391 A1 | 1/2015 | Kumar et al. |
| 2015/0026010 A1 | 1/2015 | Ellison |
| 2015/0026646 A1 | 1/2015 | Ahn et al. |
| 2015/0029339 A1 | 1/2015 | Kobres et al. |
| 2015/0039458 A1 | 2/2015 | Reid |
| 2015/0049914 A1 | 2/2015 | Alves |
| 2015/0085111 A1 | 3/2015 | Lavery |
| 2015/0124107 A1 | 5/2015 | Muriello et al. |
| 2015/0181634 A1* | 6/2015 | Cheng .................. H04W 4/026 455/426.1 |
| 2015/0193761 A1 | 7/2015 | Svetal |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0222861 A1 | 8/2015 | Fujii et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0034027 A1 | 2/2016 | Sheng |
| 2016/0078904 A1 | 3/2016 | Yamaji |
| 2016/0095511 A1 | 4/2016 | Taguchi et al. |
| 2016/0105923 A1* | 4/2016 | Chen .................. H04W 76/14 455/41.2 |
| 2016/0110760 A1 | 4/2016 | Herring et al. |
| 2016/0125245 A1 | 5/2016 | Saitwal et al. |
| 2016/0125504 A1 | 5/2016 | Narayanan |
| 2016/0155011 A1 | 6/2016 | Sulc et al. |
| 2016/0162715 A1 | 6/2016 | Luk et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0232677 A1 | 8/2016 | Liao et al. |
| 2016/0255078 A1 | 9/2016 | Zhang et al. |
| 2016/0258763 A1 | 9/2016 | High |
| 2016/0259994 A1 | 9/2016 | Ravindran et al. |
| 2016/0358145 A1* | 12/2016 | Montgomery ...... G06F 16/9535 |
| 2016/0371726 A1 | 12/2016 | Yamaji et al. |
| 2016/0381328 A1 | 12/2016 | Zhao |
| 2017/0024806 A1 | 1/2017 | High et al. |
| 2017/0026354 A1 | 1/2017 | Reece et al. |
| 2017/0032193 A1 | 2/2017 | Yang |
| 2017/0068861 A1 | 3/2017 | Miller et al. |
| 2017/0104979 A1 | 4/2017 | Shaw et al. |
| 2017/0116473 A1 | 4/2017 | Sashida et al. |
| 2017/0124096 A1 | 5/2017 | Hsi et al. |
| 2017/0132492 A1 | 5/2017 | Xie et al. |
| 2017/0148005 A1 | 5/2017 | Murn |

(56) References Cited

U.S. PATENT DOCUMENTS

| | | |
|---|---|---|
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0212586 A1 | 7/2017 | Lopez |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0108001 A1 | 4/2018 | Taylor |
| 2018/0137480 A1* | 5/2018 | Houghton, IV ...... G06F 1/1698 |
| 2018/0150788 A1 | 5/2018 | Vepakomma et al. |
| 2018/0165728 A1 | 6/2018 | McDonald et al. |
| 2018/0165733 A1 | 6/2018 | Kundu et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1 | 12/2018 | Tolbert et al. |
| 2018/0365755 A1 | 12/2018 | Bekbolatov et al. |
| 2018/0373928 A1 | 12/2018 | Glaser et al. |
| 2018/0374076 A1 | 12/2018 | Wheeler |
| 2019/0005479 A1 | 1/2019 | Glaser et al. |
| 2019/0019309 A1 | 1/2019 | Herrli et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156403 A1 | 5/2019 | Yankovich et al. |
| 2019/0156506 A1 | 5/2019 | Fisher et al. |
| 2019/0158813 A1 | 5/2019 | Rowell et al. |
| 2019/0180272 A1 | 6/2019 | Douglas |
| 2019/0188876 A1 | 6/2019 | Song et al. |
| 2019/0205905 A1 | 7/2019 | Raghunathan |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0034988 A1 | 1/2020 | Zhou |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0125824 A1 | 4/2020 | Mabyalaht et al. |
| 2020/0134588 A1 | 4/2020 | Nelms et al. |
| 2020/0151692 A1 | 5/2020 | Gao et al. |
| 2020/0193507 A1 | 6/2020 | Glaser et al. |
| 2020/0234463 A1 | 7/2020 | Fisher et al. |
| 2020/0258241 A1 | 8/2020 | Liu et al. |
| 2020/0293992 A1 | 9/2020 | Bogolea et al. |
| 2020/0294079 A1 | 9/2020 | Saha |
| 2020/0334834 A1 | 10/2020 | Fisher |
| 2020/0334835 A1 | 10/2020 | Buibas et al. |
| 2020/0349548 A1 | 11/2020 | Mangle |
| 2020/0410713 A1 | 12/2020 | Auer et al. |
| 2021/0067744 A1 | 3/2021 | Buibas et al. |
| 2021/0073901 A1 | 3/2021 | Yankovich et al. |
| 2021/0158430 A1 | 5/2021 | Buibas et al. |
| 2021/0201253 A1 | 7/2021 | Fisher et al. |
| 2021/0295081 A1 | 9/2021 | Berry et al. |
| 2022/0230216 A1 | 7/2022 | Buibas |
| 2023/0083881 A1 | 3/2023 | Chen et al. |
| 2023/0140693 A1 | 5/2023 | Fisher et al. |

FOREIGN PATENT DOCUMENTS

| | | | |
|---|---|---|---|
| CN | 105069413 A | 11/2015 | |
| CN | 105701519 A | 6/2016 | |
| CN | 104144419 B * | 5/2017 | ............ G06F 21/36 |
| CN | 104778690 B | 6/2017 | |
| CN | 108055390 A | 5/2018 | |
| EP | 1574986 B1 | 7/2008 | |
| EP | 2555162 A1 | 2/2013 | |
| EP | 2673999 B1 * | 11/2014 | ........... G01S 5/0036 |
| EP | 3002710 A1 | 4/2016 | |
| EP | 3474183 A1 | 4/2019 | |
| EP | 3474184 A1 | 4/2019 | |
| GB | 2560387 A | 9/2018 | |
| GB | 2566762 A | 3/2019 | |
| JP | H11175730 A | 7/1999 | |
| JP | 2004171240 A | 6/2004 | |
| JP | 2004171241 A | 6/2004 | |
| JP | 2004348618 A | 12/2004 | |
| JP | 2006126926 A | 5/2006 | |
| JP | 2008176504 A | 7/2008 | |
| JP | 2009055139 A | 3/2009 | |
| JP | 2009265922 A | 11/2009 | |
| JP | 2010002997 A | 1/2010 | |
| JP | 2011209966 A | 10/2011 | |
| JP | 2011253344 A | 12/2011 | |
| JP | 2012123667 A | 6/2012 | |
| JP | 2012147083 A | 8/2012 | |
| JP | 2013196199 A | 9/2013 | |
| JP | 2014089626 A | 5/2014 | |
| JP | 2015011649 A | 1/2015 | |
| JP | 2015149559 A | 8/2015 | |
| JP | 2016144049 A | 8/2016 | |
| JP | 2016532932 A | 10/2016 | |
| JP | 2016206782 A | 12/2016 | |
| JP | 2017059945 A | 3/2017 | |
| JP | 2017062776 A | 3/2017 | |
| JP | 2017157216 A | 9/2017 | |
| JP | 2018099317 A | 6/2018 | |
| KR | 1020180032400 A | 3/2018 | |
| KR | 1020190093733 A | 8/2019 | |
| KR | 102223570 B1 | 3/2021 | |
| SE | 1751401 A1 | 6/2018 | |
| TW | 201228380 A | 7/2012 | |
| TW | 201445474 A | 12/2014 | |
| TW | 201504964 A | 2/2015 | |
| TW | 201525716 A * | 7/2015 | .......... H04M 1/7253 |
| TW | 201725545 A | 7/2017 | |
| TW | 201911119 A | 3/2019 | |
| WO | 0021021 A1 | 4/2000 | |
| WO | 0243352 A2 | 5/2002 | |
| WO | 02059836 A3 | 5/2003 | |
| WO | WO-2005093654 A2 * | 10/2005 | ........... G02B 27/646 |
| WO | 2008029159 A1 | 3/2008 | |
| WO | 2009027839 A2 | 3/2009 | |
| WO | 2012067646 A1 | 5/2012 | |
| WO | 2013033442 A1 | 3/2013 | |
| WO | 2013041444 A1 | 3/2013 | |

(56) References Cited

FOREIGN PATENT DOCUMENTS

| | | | |
|---|---|---|---|
| WO | 2013103912 A1 | 7/2013 | |
| WO | WO-2014123511 A1 * | 8/2014 | ........... H04B 5/0031 |
| WO | 2014133779 A1 | 9/2014 | |
| WO | 2014209724 A1 | 12/2014 | |
| WO | WO-2014190534 A1 * | 12/2014 | ............ G06F 3/017 |
| WO | 2015017796 A2 | 2/2015 | |
| WO | 2015033577 A1 | 3/2015 | |
| WO | 2015040661 A1 | 3/2015 | |
| WO | 2015133699 A1 | 9/2015 | |
| WO | 2015173869 A1 | 11/2015 | |
| WO | 2016136144 A1 | 9/2016 | |
| WO | 2016166508 A1 | 10/2016 | |
| WO | 2017015390 A1 | 1/2017 | |
| WO | 2017151241 A2 | 9/2017 | |
| WO | 2017163909 A1 | 9/2017 | |
| WO | 2017196822 A1 | 11/2017 | |
| WO | 2018013438 A1 | 1/2018 | |
| WO | 2018013439 A1 | 1/2018 | |
| WO | WO-2018089824 A1 * | 5/2018 | ............ G01S 19/01 |
| WO | 2018148613 A1 | 8/2018 | |
| WO | 2018162929 A1 | 9/2018 | |
| WO | 2018209156 A1 | 11/2018 | |
| WO | 2018237210 A1 | 12/2018 | |
| WO | 2019032304 A1 | 2/2019 | |
| WO | 2019032305 A2 | 2/2019 | |
| WO | 2019032306 A1 | 2/2019 | |
| WO | 2019032307 A1 | 2/2019 | |
| WO | 2020023795 | 1/2020 | |
| WO | 2020023796 | 1/2020 | |
| WO | 2020023798 | 1/2020 | |
| WO | 2020023799 | 1/2020 | |
| WO | 2020023801 | 1/2020 | |
| WO | 2020023926 | 1/2020 | |
| WO | 2020023930 | 1/2020 | |
| WO | 2020047555 A1 | 3/2020 | |
| WO | 2020214775 A1 | 10/2020 | |
| WO | 2020225562 A1 | 11/2020 | |

OTHER PUBLICATIONS

Black et al., "Multi View Image Surveillance and Tracking," IEEE Proceedings of the Workshop on Motion and Video Computing, 2002, pp. 1-6.

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Cao et al., "Leveraging Convolutional Pose Machines for Fast and Accurate Head Pose Estimation", 2018 IEEE/RSJ International Conference on Intelligent Robots and Systems (IROS), Oct. 1, 2018. pp. 1089-1094.

Ceballos, Scikit-Learn Decision Trees Explained, https://towardsdatascience.com/scikit-learn-decision-trees-explained-803f3812290d, Feb. 22, 2019, 13 pages.

DeTone et al., SuperPoint: Self-Supervised Interest Point Detection and Description, Apr. 19, 2018, arXiv:1712.07629v4 [cs.CV] Apr. 19, 2018, 13 pages.

EDYN Company, Oakland, CA, Retrieved from the internt [URL: <https://edyn.com/> ]. Retrieved on May 5, 2017. 12 pages.

Erdem et al. "Automated camera layout to satisfy task-specific and floor plan-specific coverage requirements," Computer Vision and Image Undertanding 103, Aug. 1, 2006, 156-169.

Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.

Jayabalan, et al., "Dynamic Action Recognition: A convolutional neural network model for temporally organized joint location data," Cornell University, Computer Science, Dec. 20, 2016, 11 pages.

Keulian, "Naraffar, the First Staffless Convenience Store," "Stephane Keulian: Your fix of retail insights Blog" Retrieved on May 5, 2017. 3 pages. Retrieved from the internet [URL: <http://stephanekeulian.com/en/naraffar-first-staffees-convenience-store/> ].

Lin et al., Energy-Accuracy Trade-off for Continuous Mobile Device Location, MobiSys'10, Jun. 15-18, 2010, San Francisco, California, 13 pages.

Longuet-Higgens, "A computer algorithm for reconstructing a scene from two projections," Nature 293, Sep. 10, 1981, pp. 133-135.

Prindle, This Automated Store in Sweden Doesn't have Any Human Employees-Only a Smartphone App, Digital Trends, dated Feb. 29, 2016, 6 pages. Retrieved on Feb. 23, 2022. Retrieved from the internet [URL: <https:// www.digitaltrends.com/cool-tech/sweden-app-enabled-automated-store/> ].

Redmon et al., YOL09000: Better, Faster, Stronger, (available at https://arxiv.org/pdf/1612.08242.pdf), Dec. 25, 2016, 9 pages.

Redmon et al., "You Only Look Once: Unified, Real-Time Object Detection," University of Washington, Allen Institute for AIy, Facebook AI Research, May 9, 2016, 10 pages.

Rossi et al., "Tracking and Counting Moving People," IEEE Int'l Conf. on Image Processing, ICIP-94, Nov. 13-16, 1994, 5 pages.

Skioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Srinciunaite et al. "Human Pose Estimation in Space and Time Using 3D CNN," ECCV Workshop on Brave new ideas for motion representations in videos, Oct. 2016, 7 pages.

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

Vincze, "Robust tracking of ellipses at frame rate," Pattern Recognition, vol. 34, Issue 2, Feb. 2001, pp. 487-498.

Wei et al., "Convolutional Pose Machine", Proceedings of the IEEE conference on Computer Vision and Pattern Recognition, Jun. 27, 2016, pp. 4724-4732.

Yusoff et al. "Optimal Camera Placement for 3D Environment," ICSECS 2011: Software Engineering and Computer Systems, Jun. 27-29, 2011, 448-459.

Zhang "A Flexible New Technique for Camera Calibration," IEEE Transactions on Pattern Analysis and Machine Intelligence, vol. 22, No. 11, Nov. 2000, 22pages.

Gkioxari et al., "R-CNN's for Pose Estimation and Action Detection", <https://arxiv.org/pdf/1406.5212.pdf>, Jun. 19, 2014.

Annavajhala, Ravi "Cashierless Stores Are Getting A Mind Of Their Own"Forbes Article Sep. 29, 2022 pp. 1-5 (Year. 2022).

Lee et al., Monitoring Activities from Activities from multiple video streams: Establishing a common coordinate frame, IEEE Transactions on Pattern Analysis and Machine Intelligence, IEEE Computer Society, vol. 22, No. 8, dated Aug. 1, 2000, pp. 758-767, 10 pages.

Hofmann et al., Hypergraphs for Joint Multi-view Reconstruction and Multi-object Tracking, 2017, IEEE Conference on Computer Vision and Pattern Recognition, IEEE Computer Society, dated Jun. 23, 2013, pp. 3650-3657, 8 pages.

Khan et al., "Skin detection: A random forest approach", Proceedings of 2010 IEEE 17th International Conference on Image Processing, Sep. 26-29, 2010, pp. 4613-4616.

(56) References Cited

OTHER PUBLICATIONS

Sheeney De Moraes, Marcel et al., Deep Convolutional Poses for Human Interaction Recognition Monocular Videos, School of Engineering & Physical Sciences, Heriot-Watt University, dated Dec. 13, 2016.
Annavajjhala, Ravi "Cashierless Stores Are Getting A Mind Of Their Own "Forbes Article Sep. 29, 2022 pp. 1-5 (Year: 2022).

\* cited by examiner

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 400

FIG. 4

```
Subject = { Key  = frame_number
          Value = { Key  = camera_id
                   Value = Assigned joints to subject
                   [
                       [x of joint1, y of joint1, z of joint1],
                       [x of joint2, y of joint2, z of joint2],
                       ........
                       ........
                       [x of joint18, y of joint18, z of joint18],
                   ]
                 }
          }
```

Subject Data Structure 500

FIG. 5

SYSTEMS AND METHODS TO CHECK-IN SHOPPERS IN A CASHIER-LESS STORE

PRIORITY APPLICATION

This application is a continuation of U.S. patent application Ser. No. 18/089,503, filed 27 Dec. 2022, now U.S. Pat. No. 11,810,317, issuing 7 Nov. 2023, which is a continuation of U.S. patent application Ser. No. 17/383,303, filed 22 Jul. 2021, now U.S. Pat. No. 11,538,186, which is a continuation of U.S. patent application Ser. No. 16/842,382 filed 7 Apr. 2020, now U.S. Pat. No. 11,200,692, which application is a continuation of U.S. patent application Ser. No. 16/255,573 filed 23 Jan. 2019, now U.S. Pat. No. 10,650,545, and Ser. No. 16/255,573 is a continuation-in-part of U.S. patent application Ser. No. 15/945,473, filed 4 Apr. 2018, now U.S. Pat. No. 10,474,988, which is a continuation-in-part of U.S. patent application Ser. No. 15/907,112, filed 27 Feb. 2018, now U.S. Pat. No. 10,133,933, which is a continuation-in-part of U.S. patent application Ser. No. 15/847,796, filed 19 Dec. 2017, now U.S. Pat. No. 10,055,853, which claims benefit of U.S. Provisional Patent Application No. 62/542,077 filed 7 Aug. 2017, which applications are incorporated herein by reference.

BACKGROUND

Field

The present invention relates to systems that link subjects in an area of real space with user accounts linked with client applications executing on mobile computing devices.

Description of Related Art

Identifying subjects within an area of real space, such as people in a shopping store, uniquely associating the identified subjects with real people or with authenticated accounts associated with responsible parties can present many technical challenges. For example, consider such an image processing system deployed in a shopping store with multiple customers moving in aisles between the shelves and open spaces within the shopping store. Customers take items from shelves and put those in their respective shopping carts or baskets. Customers may also put items on the shelf, if they do not want the item. Though the system may identify a subject in the images, and the items the subject takes, the system must accurately identify an authentic user account responsible for the taken items by that subject.

In some systems, facial recognition, or other biometric recognition technique, might be used to identify the subjects in the images, and link them with accounts. This approach, however, requires access by the image processing system to databases storing the personal identifying biometric information, linked with the accounts. This is undesirable from a security and privacy standpoint in many settings.

It is desirable to provide a system that can more effectively and automatically link a subject in an area of real space to a user known to the system for providing services to the subject. Also, it is desirable to provide image processing systems by which images of large spaces are used to identify subjects without requiring personal identifying biometric information of the subjects.

SUMMARY

A system, and method for operating a system, are provided for linking subjects, such as persons in an area of real space, with user accounts. The system can use image processing to identify subjects in the area of real space without requiring personal identifying biometric information. The user accounts are linked with client applications executable on mobile computing devices. This function of linking identified subjects to user accounts by image and signal processing presents a complex problem of computer engineering, relating to the type of image and signal data to be processed, what processing of the image and signal data to perform, and how to determine actions from the image and signal data with high reliability.

A system and method are provided for linking subjects in an area of real space with user accounts. The user accounts are linked with client applications executable on mobile computing devices. A plurality of cameras or other sensors produce respective sequences of images in corresponding fields of view in the real space. Using these sequences of images, a system and method are described for determining locations of identified subjects represented in the images and matching the identified subjects with user accounts by identifying locations of mobile devices executing client applications in the area of real space and matching locations of the mobile devices with locations of the subjects.

In one embodiment described herein, the mobile devices emit signals usable to indicate locations of the mobile devices in the area of real space. The system matches the identified subjects with user accounts by identifying locations of mobile devices using the emitted signals.

In one embodiment, the signals emitted by the mobile devices comprise images. In a described embodiment, the client applications on the mobile devices cause display of semaphore images, which can be as simple as a particular color, on the mobile devices in the area of real space. The system matches the identified subjects with user accounts by identifying locations of mobile devices by using an image recognition engine that determines locations of the mobile devices displaying semaphore images. The system includes a set of semaphore images. The system accepts login communications from a client application on a mobile device identifying a user account before matching the user account to an identified subject in the area of real space. After accepting login communications, the system sends a selected semaphore image from the set of semaphore images to the client application on the mobile device. The system sets a status of the selected semaphore image as assigned. The system receives a displayed image of the selected semaphore image, recognizes the displayed image and matches the recognized image with the assigned images from the set of semaphore images. The system matches a location of the mobile device displaying the recognized semaphore image located in the area of real space with a not yet linked identified subject. The system, after matching the user account to the identified subject, sets the status of the recognized semaphore image as available.

In one embodiment, the signals emitted by the mobile devices comprise radio signals indicating a service location of the mobile device. The system receives location data transmitted by the client applications on the mobile devices. The system matches the identified subjects with user accounts using the location data transmitted from the mobile devices. The system uses the location data transmitted from the mobile device from a plurality of locations over a time interval in the area of real space to match the identified subjects with user accounts. This matching the identified unmatched subject with the user account of the client application executing on the mobile device includes determining that all other mobile devices transmitting location information of unmatched user accounts are separated from the mobile device by a predetermined distance and determining a closest unmatched identified subject to the mobile device.

In one embodiment, the signals emitted by the mobile devices comprise radio signals indicating acceleration and orientation of the mobile device. In one embodiment, such acceleration data is generated by accelerometer of the mobile computing device. In another embodiment, in addition to the accelerometer data, direction data from a compass on the mobile device is also received by the processing system. The system receives the accelerometer data from the client applications on the mobile devices. The system matches the identified subjects with user accounts using the accelerometer data transmitted from the mobile device. In this embodiment, the system uses the accelerometer data transmitted from the mobile device from a plurality of locations over a time interval in the area of real space and derivative of data indicating the locations of identified subjects over the time interval in the area of real space to match the identified subjects with user accounts.

In one embodiment, the system matches the identified subjects with user accounts using a trained network to identify locations of mobile devices in the area of real space based on the signals emitted by the mobile devices. In such an embodiment, the signals emitted by the mobile devices include location data and accelerometer data.

In one embodiment, the system includes log data structures including a list of inventory items for the identified subjects. The system associates the log data structure for the matched identified subject to the user account for the identified subject.

In one embodiment, the system processes a payment for the list of inventory items for the identified subject from a payment method identified in the user account linked to the identified subject.

In one embodiment, the system matches the identified subjects with user accounts without use of personal identifying biometric information associated with the user accounts.

Methods and computer program products which can be executed by computer systems are also described herein.

Other aspects and advantages of the present invention can be seen on review of the drawings, the detailed description and the claims, which follow.

BRIEF DESCRIPTION OF THE DRAWINGS

FIG. 4 shows an example data structure for storing joints information of subjects.

FIG. 5 shows an example data structure for storing a subject including the information of associated joints.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1-11. The system and processes are described with reference to FIG. 1, an architectural level schematic of a system in accordance with an implementation. Because FIG. 1 is an architectural diagram, certain details are omitted to improve the clarity of the description.

Figure 1:
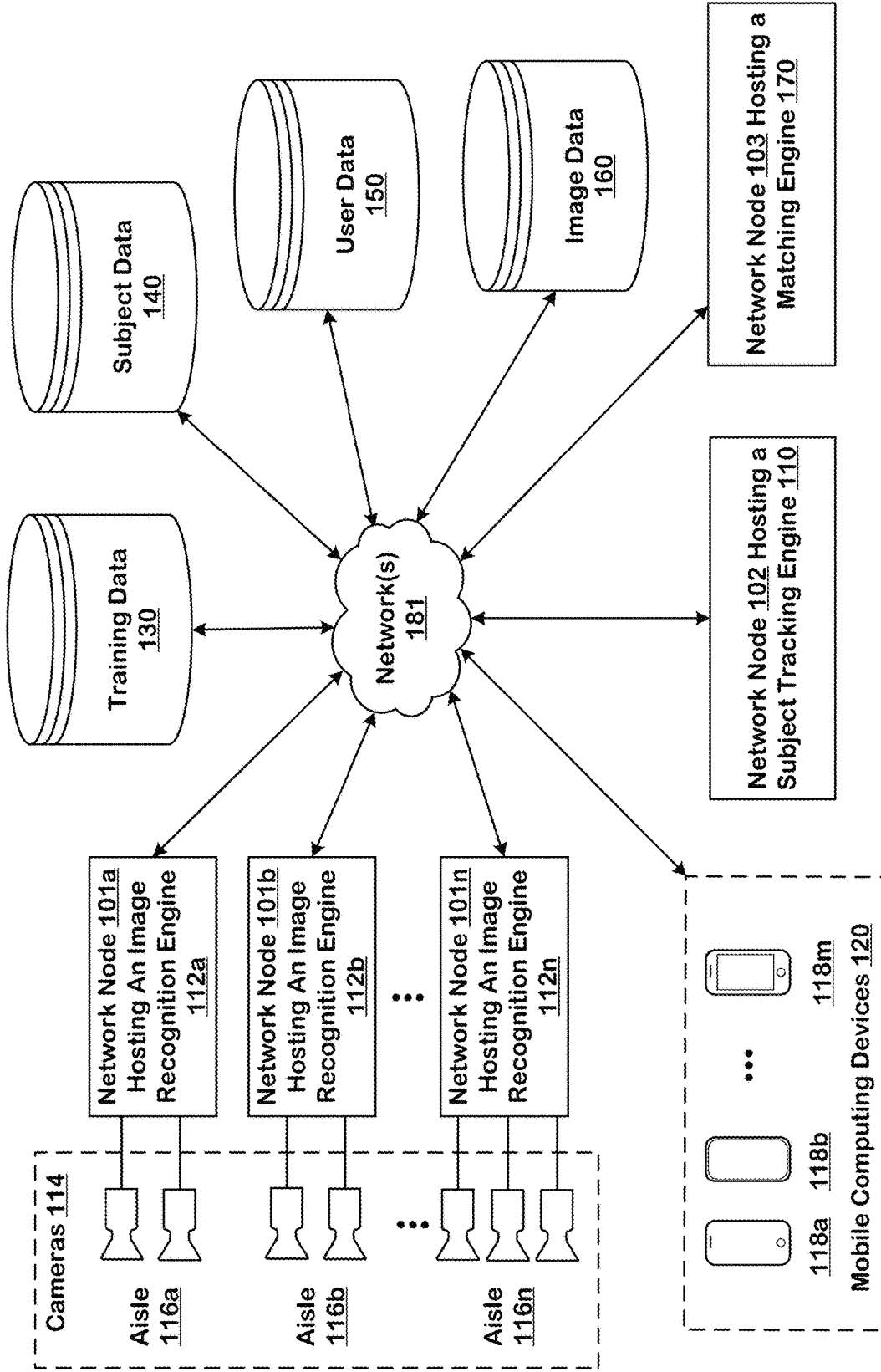
FIG. 1 illustrates an architectural level schematic of a system in which a matching engine links subjects identified by a subject tracking engine to user accounts linked with client applications executing on mobile devices.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, a subject tracking engine 110 deployed in a network node 102 (or nodes) on the network, mobile computing devices 118a, 118b, 118m (collectively referred as mobile computing devices 120), a training database 130, a subject database 140, a user account database 150, an image database 160, a matching engine 170 deployed in a network node or nodes (also known as a processing platform) 103, and a communication network or networks 181. The network nodes can host only one image recognition engine, or several image recognition engines. The system can also include an inventory database and other supporting data.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting image recognition engines are shown in the system 100. However, any number of network nodes hosting image recognition engines can be connected to the subject tracking engine 110 through the network(s) 181. Similarly, three mobile computing devices are shown in the system 100. However, any number of mobile computing devices can be connected to the network node 103 hosting the matching engine 170 through the network(s) 181. Also, an image recognition engine, a subject tracking engine, a matching engine and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 102 hosting the subject tracking engine 110, the mobile computing devices 118a, 118b, and 118m, the training database 130, the subject database 140, the user account database 150, the image database 160, and the network node 103 hosting the matching engine 170. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned over each aisle to capture images of real space in the store. In FIG. 1, two cameras are arranged over aisle 116a, two cameras are arranged over aisle 116b, and three cameras are arranged over aisle 116n. The cameras 114 are installed over aisles with overlapping fields of view. In such an embodiment, the cameras are configured with the goal that customers moving in the aisles of the shopping store are present in the field of view of two or more cameras at any moment in time.

Cameras 114 can be synchronized in time with each other, so that images are captured at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame id") along with the image data. Other embodiments of the technology disclosed can use different types of sensors such as infrared or RF image sensors, ultrasound sensors, thermal sensors, Lidars, etc., to generate this data. Multiple types of sensors can be used, including for example ultrasound or RF sensors in addition to the cameras 114 that generate RGB color output. Multiple sensors can be synchronized in time with each other, so that frames are captured by the sensors at the same time, or close in time, and at the same frame capture rate. In all of the embodiments described herein sensors other than cameras, or sensors of multiple types, can be used to produce the sequences of images utilized.

Cameras installed over an aisle are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example.

In one embodiment, each image recognition engine 112a, 112b, and 112n is implemented as a deep learning algorithm such as a convolutional neural network (abbreviated CNN). In such an embodiment, the CNN is trained using a training database 130. In an embodiment described herein, image recognition of subjects in the real space is based on identifying and grouping joints recognizable in the images, where the groups of joints can be attributed to an individual subject. For this joints-based analysis, the training database 130 has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database 130, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects. These groups of joints may not uniquely identify the individual in the image, or an authentic user account for the individual in the image, but can be used to track a subject in the area. The subjects can be identified and tracked by the system using an identifier "subject_id" during their presence in the area of real space.

For example, when a customer enters a shopping store, the system identifies the customer using joints analysis as described above and is assigned a "subject_id". This identifier is, however, not linked to real world identity of the subject such as user account, name, driver's license, email addresses, mailing addresses, credit card numbers, bank account numbers, driver's license number, etc. or to identifying biometric identification such as fingerprints, facial recognition, hand geometry, retina scan, iris scan, voice recognition, etc. Therefore, the identified subject is anonymous. Details of an example technology for subject identification and tracking are presented in U.S. Pat. No. 10,055,853, issued 21 Aug. 2018, titled, "Subject Identification and Tracking Using Image Recognition Engine" which is incorporated herein by reference as if fully set forth herein.

The subject tracking engine 110, hosted on the network node 102 receives, in this example, continuous streams of arrays of joints data structures for the subjects from image recognition engines 112a-112n. The subject tracking engine 110 processes the arrays of joints data structures and translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is stored in the subject database 140.

The subject tracking engine 110 uses logic to identify groups or sets of candidate joints having coordinates in real space as subjects in the real space. For the purposes of analogy, each set of candidate points is like a constellation of candidate joints at each point in time. The constellations of candidate joints can move over time.

In an example embodiment, the logic to identify sets of candidate joints comprises heuristic functions based on physical relationships amongst joints of subjects in real space. These heuristic functions are used to identify sets of candidate joints as subjects. The sets of candidate joints comprise individual candidate joints that have relationships according to the heuristic parameters with other individual candidate joints and subsets of candidate joints in a given set that has been identified, or can be identified, as an individual subject.

In the example of a shopping store, as the customer completes shopping and moves out of the store, the system processes payment of items bought by the customer. In a cashier-less store, the system has to link the customer with a "user account" containing preferred payment method provided by the customer.

As described above, the "identified subject" is anonymous because information about the joints and relationships among the joints is not stored as biometric identifying information linked to an individual or to a user account.

The system includes a matching engine 170 (hosted on the network node 103) to process signals received from mobile computing devices 120 (carried by the subjects) to match the identified subjects with user accounts. The matching can be performed by identifying locations of mobile devices executing client applications in the area of real space (e.g., the shopping store) and matching locations of mobile devices with locations of subjects, without use of personal identifying biometric information from the images.

The actual communication path to the network node 103 hosting the matching engine 170 through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Camera Arrangement

The cameras 114 are arranged to track multi-joint subjects (or entities) in a three-dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2:
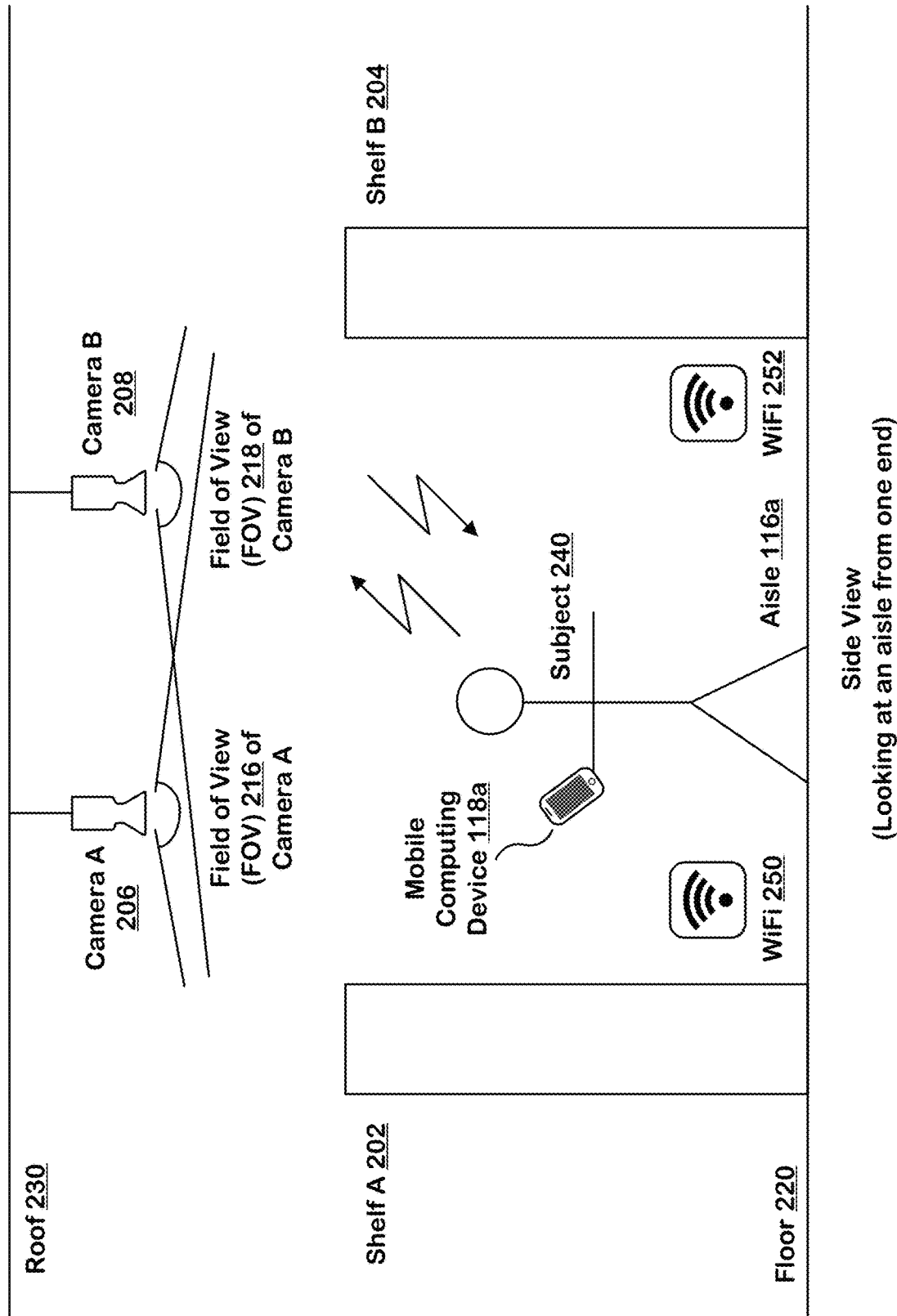
FIG. 2 is a side view of an aisle in a shopping store illustrating a subject with a mobile computing device and a camera arrangement.

In a shopping store, the shelves and other inventory display structures can be arranged in a variety of manners, such as along the walls of the shopping store, or in rows forming aisles or a combination of the two arrangements. FIG. 2 shows an arrangement of shelves, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelves. The cameras 114 comprise cameras disposed over and having fields of view encompassing respective parts of the inventory display structures and floor area in the real space. The coordinates in real space of members of a set of candidate joints, identified as a subject, identify locations of the subject in the floor area. In FIG. 2, a subject 240 is holding the mobile computing device 118a and standing on the floor 220 in the aisle 116a. The mobile computing device can send and receive signals through the wireless network(s) 181. In one example, the mobile computing devices 120 communicate through a wireless network using for example a Wi-Fi protocol, or other wireless protocols like Bluetooth, ultra-wideband, and ZigBee, through wireless access points (WAP) 250 and 252.

In the example embodiment of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store.

In FIG. 2, the cameras 206 and 208 have overlapping fields of view, covering the space between a shelf A 202 and a shelf B 204 with overlapping fields of view 216 and 218, respectively. A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration.

Figure 3:
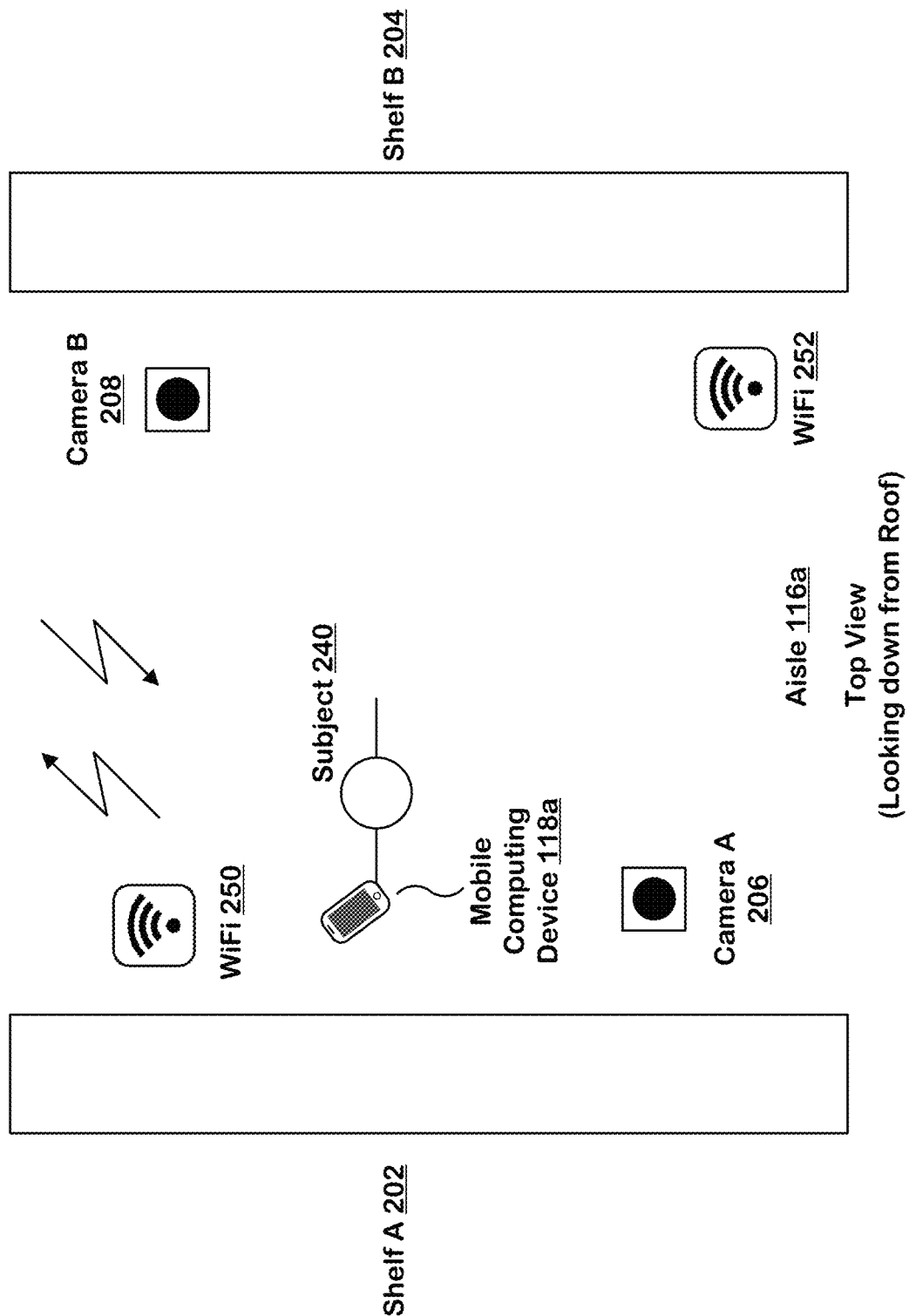
FIG. 3 is a top view of the aisle of FIG. 2 in a shopping store illustrating the subject with the mobile computing device and the camera arrangement.

FIG. 3 illustrates the aisle 116a viewed from the top of FIG. 2, further showing an example arrangement of the positions of cameras 206 and 208 over the aisle 116a. The cameras 206 and 208 are positioned closer to opposite ends of the aisle 116a. The camera A 206 is positioned at a predetermined distance from the shelf A 202 and the camera B 208 is positioned at a predetermined distance from the shelf B 204. In another embodiment, in which more than two cameras are positioned over an aisle, the cameras are positioned at equal distances from each other. In such an embodiment, two cameras are positioned close to the opposite ends and a third camera is positioned in the middle of the aisle. It is understood that a number of different camera arrangements are possible.

Joints Data Structure

The image recognition engines 112a-112n receive the sequences of images from cameras 114 and process images to generate corresponding arrays of joints data structures. In one embodiment, the image recognition engines 112a-112n identify one of the 19 possible joints of each subject at each element of the image. The possible joints can be grouped in two categories: foot joints and non-foot joints. The $19^{th}$ type of joint classification is for all non-joint features of the subject (i.e. elements of the image not classified as a joint).

Foot Joints:
    Ankle joint (left and right)
Non-foot Joints:
    Neck
    Nose
    Eyes (left and right)
    Ears (left and right)
    Shoulders (left and right)
    Elbows (left and right)
    Wrists (left and right)
    Hip (left and right)
    Knees (left and right)
Not a joint An array of joints data structures for a particular image classifies elements of the particular image by joint type, time of the particular image, and the coordinates of the elements in the particular image. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 400 as shown in FIG. 4 is used to store the information of each joint. The joints data structure 400 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures corresponding to images in different sequences into candidate joints having coordinates in the real space. The tracking engine 110 comprises logic to identify sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in the subject database 140, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for assignment of joints to subjects. In such an embodiment, a high-level input, processing and output of the tracking engine 110 is illustrated in table 1. Details of the logic applied by the subject tracking engine 110 to create subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated herein by reference.

TABLE 1

Inputs, processing and outputs from subject tracking engine 110 in an example embodiment.

| Inputs | Processing | Output |
| --- | --- | --- |
| Arrays of joints data structures per image and for each joints data structure Unique ID | Create joints dictionary Reproject joint positions in the fields of view of cameras with overlapping fields of view to candidate | List of identified subjects in the real space at a moment in time |

TABLE 1-continued

Inputs, processing and outputs from subject
tracking engine 110 in an example embodiment.

| Inputs | Processing | Output |
|---|---|---|
| Confidence number<br>Joint number<br>(x, y) position in<br>image space | joints | |

Subject Data Structure

The subject tracking engine 110 uses heuristics to connect joints of subjects identified by the image recognition engines 112a-112n. In doing so, the subject tracking engine 110 creates new subjects and updates the locations of existing subjects by updating their respective joint locations. The subject tracking engine 110 uses triangulation techniques to project the locations of joints from 2D space coordinates (x, y) to 3D real space coordinates (x, y, z). FIG. 5 shows the subject data structure 500 used to store the subject. The subject data structure 500 stores the subject related data as a key-value dictionary. The key is a frame_number and the value is another key-value dictionary where key is the camera_id and value is a list of 18 joints (of the subject) with their locations in the real space. The subject data is stored in the subject database 140. Every new subject is also assigned a unique identifier that is used to access the subject's data in the subject database 140.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the image analysis is anonymous, i.e., a unique identifier assigned to a subject created through joints analysis does not identify personal identification of the subject as described above.

Matching Engine

The matching engine 170 includes logic to match the identified subjects with their respective user accounts by identifying locations of mobile devices (carried by the identified subjects) that are executing client applications in the area of real space. In one embodiment, the matching engine uses multiple techniques, independently or in combination, to match the identified subjects with the user accounts. The system can be implemented without maintaining biometric identifying information about users, so that biometric information about account holders is not exposed to security and privacy concerns raised by distribution of such information.

In one embodiment, a customer logs in to the system using a client application executing on a personal mobile computing device upon entering the shopping store, identifying an authentic user account to be associated with the client application on the mobile device. The system then sends a "semaphore" image selected from the set of unassigned semaphore images in the image database 160 to the client application executing on the mobile device. The semaphore image is unique to the client application in the shopping store as the same image is not freed for use with another client application in the store until the system has matched the user account to an identified subject. After that matching, the semaphore image becomes available for use again. The client application causes the mobile device to display the semaphore image, which display of the semaphore image is a signal emitted by the mobile device to be detected by the system. The matching engine 170 uses the image recognition engines 112a-n or a separate image recognition engine (not shown in FIG. 1) to recognize the semaphore image and determine the location of the mobile computing device displaying the semaphore in the shopping store. The matching engine 170 matches the location of the mobile computing device to a location of an identified subject. The matching engine 170 then links the identified subject (stored in the subject database 140) to the user account (stored in the user account database 150) linked to the client application for the duration in which the subject is present in the shopping store. No biometric identifying information is used for matching the identified subject with the user account, and none is stored in support of this process. That is, there is no information in the sequences of images used to compare with stored biometric information for the purposes of matching the identified subjects with user accounts in support of this process.

In other embodiments, the matching engine 170 uses other signals in the alternative or in combination from the mobile computing devices 120 to link the identified subjects to user accounts. Examples of such signals include a service location signal identifying the position of the mobile computing device in the area of the real space, speed and orientation of the mobile computing device obtained from the accelerometer and compass of the mobile computing device, etc.

In some embodiments, though embodiments are provided that do not maintain any biometric information about account holders, the system can use biometric information to assist matching a not-yet-linked identified subject to a user account. For example, in one embodiment, the system stores "hair color" of the customer in his or her user account record. During the matching process, the system might use for example hair color of subjects as an additional input to disambiguate and match the subject to a user account. If the user has red colored hair and there is only one subject with red colored hair in the area of real space or in close proximity of the mobile computing device, then the system might select the subject with red hair color to match the user account.

The flowcharts in FIGS. 6 to 9C present process steps of four techniques usable alone or in combination by the matching engine 170.

Semaphore Images

Figure 6:
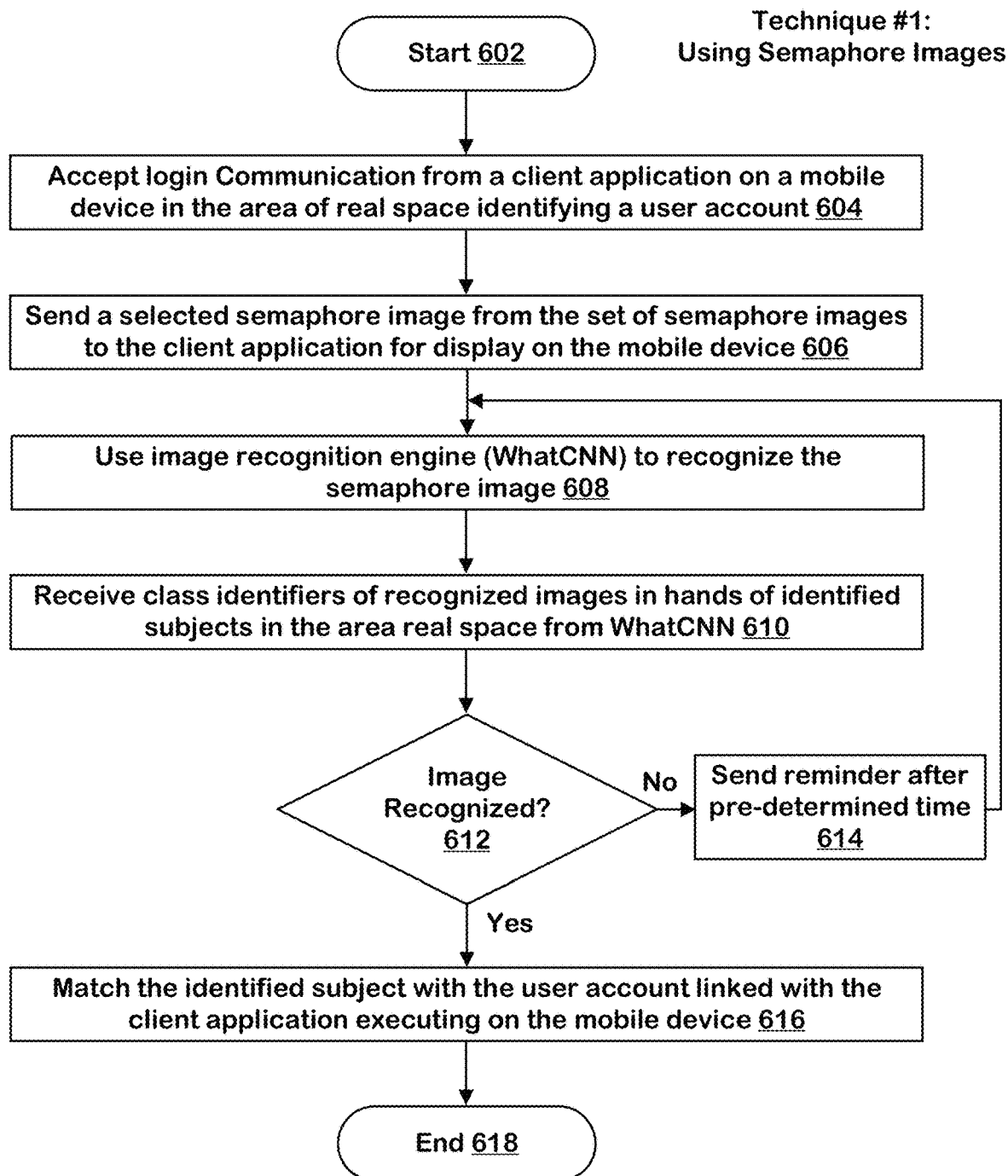
FIG. 6 is a flowchart showing process steps for matching an identified subject to a user account using a semaphore image displayed on a mobile computing device.

FIG. 6 is a flowchart 600 presenting process steps for a first technique for matching identified subjects in the area of real space with their respective user accounts. In the example of a shopping store, the subjects are customers (or shoppers) moving in the store in aisles between shelves and other open spaces. The process starts at step 602. As a subject enters the area of real space, the subject opens a client application on a mobile computing device and attempts to login. The system verifies the user credentials at step 604 (for example, by querying the user account database 150) and accepts login communication from the client application to associate an authenticated user account with the mobile computing device. The system determines that the user account of the client application is not yet linked to an identified subject. The system sends a semaphore image to the client application for display on the mobile computing device at step 606. Examples of semaphore images include various shapes of solid colors such as a red rectangle or a pink elephant, etc. A variety of images can be used as semaphores, preferably suited for high confidence recognition by the image recognition engine. Each semaphore image can have a unique identifier. The processing system includes logic to accept login communications from a client application on a mobile device identifying a user account before matching the user account to an identified subject in the area of real space, and after accepting login communications sends a selected semaphore image from the set of semaphore images to the client application on the mobile device.

In one embodiment, the system selects an available semaphore image from the image database 160 for sending to the client application. After sending the semaphore image to the client application, the system changes a status of the semaphore image in the image database 160 as "assigned" so that this image is not assigned to any other client application. The status of the image remains as "assigned" until the process to match the identified subject to the mobile computing device is complete. After matching is complete, the status can be changed to "available." This allows for rotating use of a small set of semaphores in a given system, simplifying the image recognition problem.

The client application receives the semaphore image and displays it on the mobile computing device. In one embodiment, the client application also increases the brightness of the display to increase the image visibility. The image is captured by one or more cameras 114 and sent to an image processing engine, referred to as WhatCNN. The system uses WhatCNN at step 608 to recognize the semaphore images displayed on the mobile computing device. In one embodiment, WhatCNN is a convolutional neural network trained to process the specified bounding boxes in the images to generate a classification of hands of the identified subjects. One trained WhatCNN processes image frames from one camera. In the example embodiment of the shopping store, for each hand joint in each image frame, the WhatCNN identifies whether the hand joint is empty. The WhatCNN also identifies a semaphore image identifier (in the image database 160) or an SKU (stock keeping unit) number of the inventory item in the hand joint, a confidence value indicating the item in the hand joint is a non-SKU item (i.e. it does not belong to the shopping store inventory) and a context of the hand joint location in the image frame.

As mentioned above, two or more cameras with overlapping fields of view capture images of subjects in real space. Joints of a single subject can appear in image frames of multiple cameras in a respective image channel. A WhatCNN model per camera identifies semaphore images (displayed on mobile computing devices) in hands (represented by hand joints) of subjects. A coordination logic combines the outputs of WhatCNN models into a consolidated data structure listing identifiers of semaphore images in left hand (referred to as left_hand_classid) and right hand (right_hand_classid) of identified subjects (step 610). The system stores this information in a dictionary mapping subject_id to left_hand_classid and right_hand_classid along with a timestamp, including locations of the joints in real space. The details of WhatCNN are presented in U.S. patent application Ser. No. 15/907,112, filed 27 Feb. 2018, titled, "Item Put and Take Detection Using Image Recognition" which is incorporated herein by reference as if fully set forth herein.

At step 612, the system checks if the semaphore image sent to the client application is recognized by the WhatCNN by iterating the output of the WhatCNN models for both hands of all identified subjects. If the semaphore image is not recognized, the system sends a reminder at a step 614 to the client application to display the semaphore image on the mobile computing device and repeats process steps 608 to 612. Otherwise, if the semaphore image is recognized by WhatCNN, the system matches a user_account (from the user account database 150) associated with the client application to subject_id (from the subject database 140) of the identified subject holding the mobile computing device (step 616). In one embodiment, the system maintains this mapping (subject_id-user_account) until the subject is present in the area of real space. The process ends at step 618.

Service Location

Figure 7:
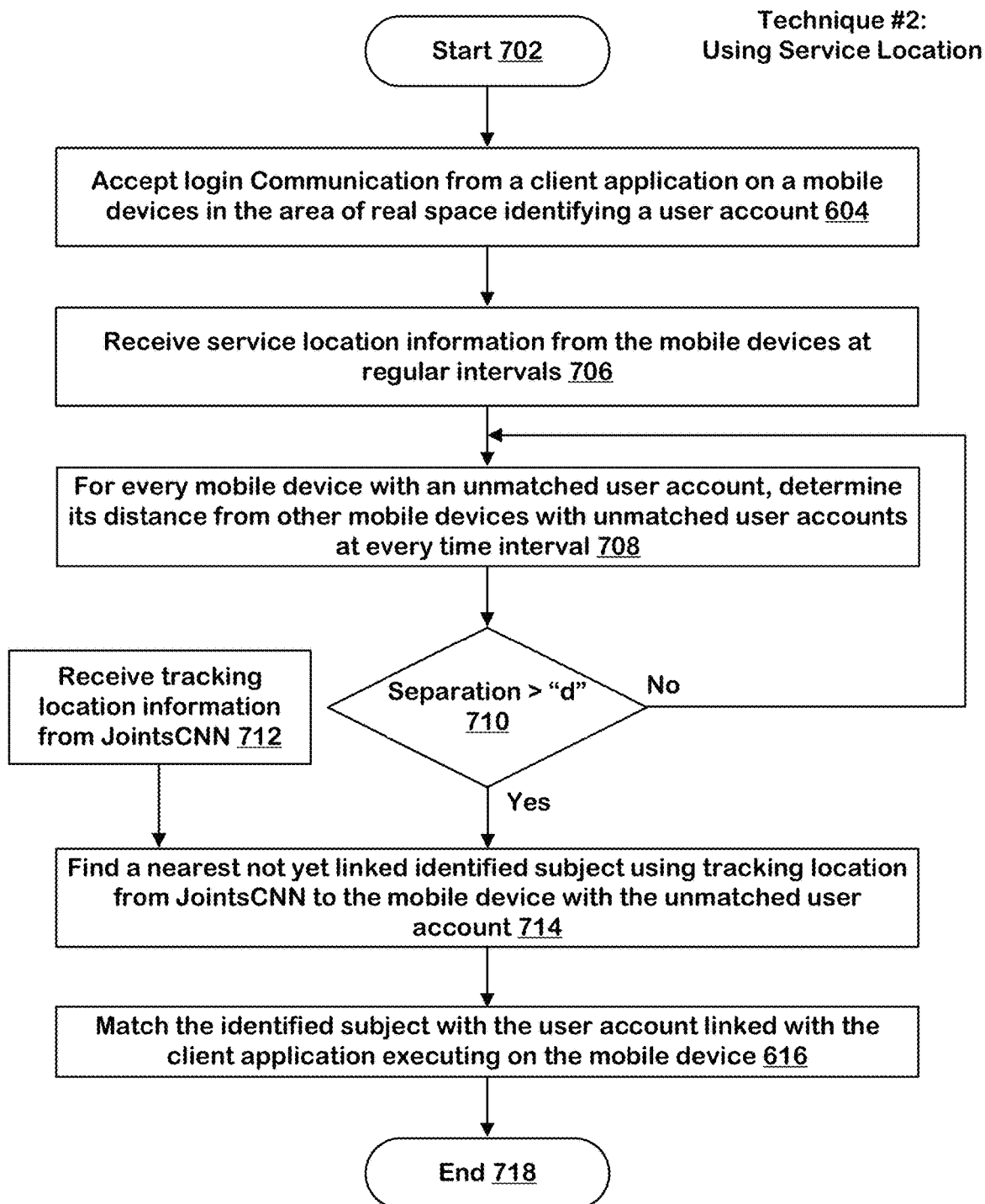
FIG. 7 is a flowchart showing process steps for matching an identified subject to a user account using service location of a mobile computing device.

The flowchart 700 in FIG. 7 presents process steps for a second technique for matching identified subjects with user accounts. This technique uses radio signals emitted by the mobile devices indicating location of the mobile devices. The process starts at step 702, the system accepts login communication from a client application on a mobile computing device as described above in step 604 to link an authenticated user account to the mobile computing device. At step 706, the system receives service location information from the mobile devices in the area of real space at regular intervals. In one embodiment, latitude and longitude coordinates of the mobile computing device emitted from a global positioning system (GPS) receiver of the mobile computing device are used by the system to determine the location. In one embodiment, the service location of the mobile computing device obtained from GPS coordinates has an accuracy between 1 to 3 meters. In another embodiment, the service location of a mobile computing device obtained from GPS coordinates has an accuracy between 1 to 5 meters.

Other techniques can be used in combination with the above technique or independently to determine the service location of the mobile computing device. Examples of such techniques include using signal strengths from different wireless access points (WAP) such as 250 and 252 shown in FIGS. 2 and 3 as an indication of how far the mobile computing device is from respective access points. The system then uses known locations of wireless access points (WAP) 250 and 252 to triangulate and determine the position of the mobile computing device in the area of real space. Other types of signals (such as Bluetooth, ultra-wideband, and ZigBee) emitted by the mobile computing devices can also be used to determine a service location of the mobile computing device.

The system monitors the service locations of mobile devices with client applications that are not yet linked to an identified subject at step 708 at regular intervals such as every second. At step 708, the system determines the distance of a mobile computing device with an unmatched user account from all other mobile computing devices with unmatched user accounts. The system compares this distance with a pre-determined threshold distance "d" such as 3 meters. If the mobile computing device is away from all other mobile devices with unmatched user accounts by at least "d" distance (step 710), the system determines a nearest not yet linked subject to the mobile computing device (step 714). The location of the identified subject is obtained from the output of the JointsCNN at step 712. In one embodiment the location of the subject obtained from the JointsCNN is more accurate than the service location of the mobile computing device. At step 616, the system performs the same process as described above in flowchart 600 to match the subject_id of the identified subject with the user_account of the client application. The process ends at a step 718.

No biometric identifying information is used for matching the identified subject with the user account, and none is stored in support of this process. That is, there is no information in the sequences of images used to compare with stored biometric information for the purposes of matching the identified subjects with user account in support of this process. Thus, this logic to match the identified subjects with user accounts operates without use of personal identifying biometric information associated with the user accounts.

Speed and Orientation

Figure 8:
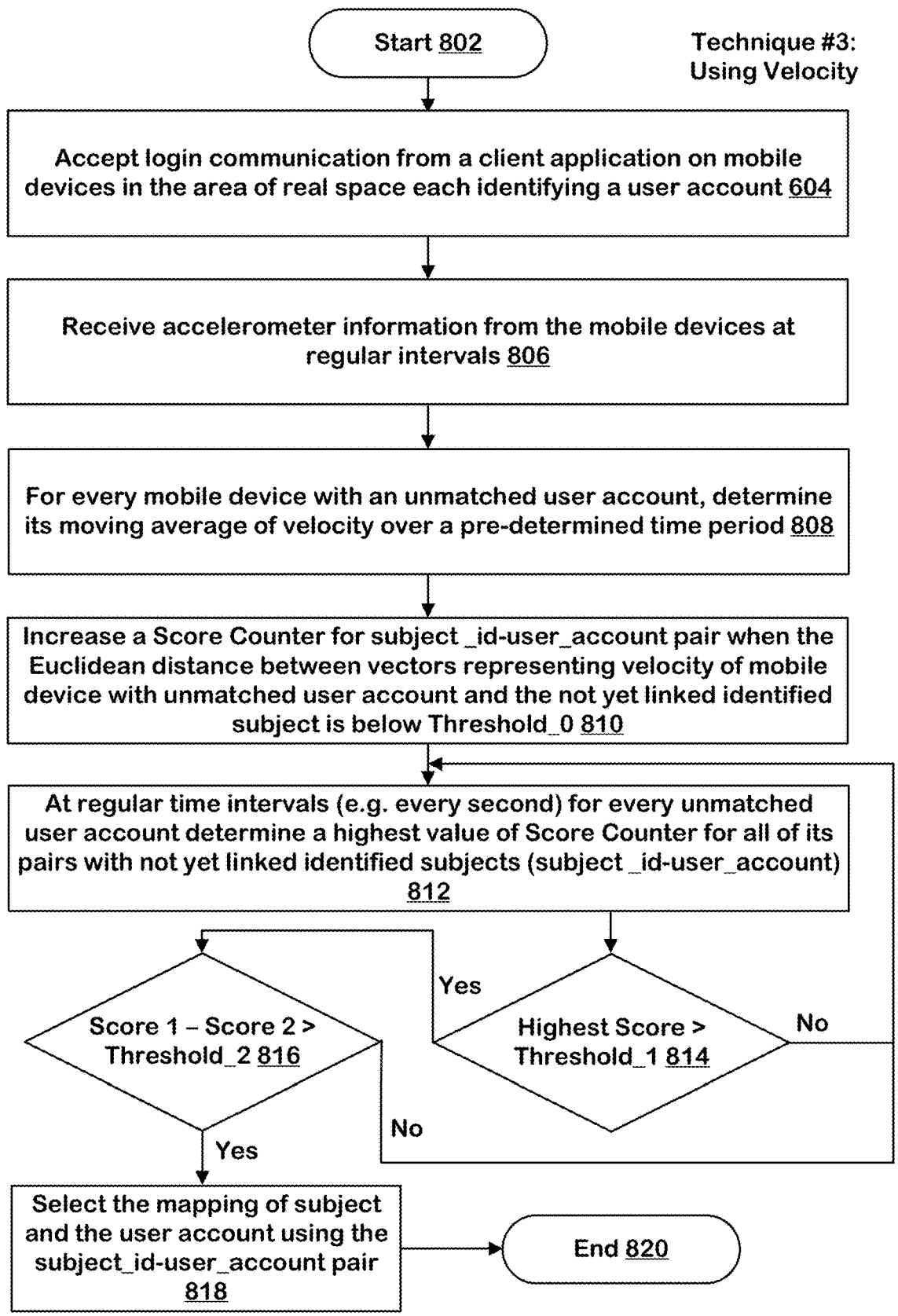
FIG. 8 is a flowchart showing process steps for matching an identified subject to a user account using velocity of subjects and a mobile computing device.

The flowchart 800 in FIG. 8 presents process steps for a third technique for matching identified subjects with user accounts. This technique uses signals emitted by an accelerometer of the mobile computing devices to match identified subjects with client applications. The process starts at step 802. The process starts at step 604 to accept login communication from the client application as described above in the first and second techniques. At step 806, the system receives signals emitted from the mobile computing devices carrying data from accelerometers on the mobile computing devices in the area of real space, which can be sent at regular intervals. At a step 808, the system calculates an average velocity of all mobile computing devices with unmatched user accounts.

The accelerometers provide acceleration of mobile computing devices along the three axes (x, y, z). In one embodiment, the velocity is calculated by taking the accelerations values at small time intervals (e.g., at every 10 milliseconds) to calculate the current velocity at time "t" i.e., $v_t = v_0 + a_t$, where $v_0$ is initial velocity. In one embodiment, the $v_0$ is initialized as "0" and subsequently, for every time t+1, $v_t$ becomes $v_0$. The velocities along the three axes are then combined to determine an overall velocity of the mobile computing device at time "t." Finally at step 808, the system calculates moving averages of velocities of all mobile computing devices over a larger period of time such as 3 seconds which is long enough for the walking gait of an average person, or over longer periods of time.

At step 810, the system calculates Euclidean distance (also referred to as L2 norm) between velocities of all pairs of mobile computing devices with unmatched client applications to not yet linked identified subjects. The velocities of subjects are derived from changes in positions of their joints with respect to time, obtained from joints analysis and stored in respective subject data structures 500 with timestamps. In one embodiment, a location of center of mass of each subject is determined using the joints analysis. The velocity, or other derivative, of the center of mass location data of the subject is used for comparison with velocities of mobile computing devices. For each subject_id-user_account pair, if the value of the Euclidean distance between their respective velocities is less than a threshold_0, a score_counter for the subject_id-user_account pair is incremented. The above process is performed at regular time intervals, thus updating the score_counter for each subject_id-user_account pair.

At regular time intervals (e.g., every one second), the system compares the score_counter values for pairs of every unmatched user account with every not yet linked identified subject (step 812). If the highest score is greater than threshold_1 (step 814), the system calculates the difference between the highest score and the second highest score (for pair of same user account with a different subject) at step 816. If the difference is greater than threshold_2, the system selects the mapping of user_account to the identified subject at step 818 and follows the same process as described above in step 616. The process ends at a step 820.

In another embodiment, when JointsCNN recognizes a hand holding a mobile computing device, the velocity of the hand (of the identified subject) holding the mobile computing device is used in above process instead of using the velocity of the center of mass of the subject. This improves performance of the matching algorithm. To determine values of the thresholds (threshold_0, threshold_1, threshold_2), the system uses training data with labels assigned to the images. During training, various combinations of the threshold values are used and the output of the algorithm is matched with ground truth labels of images to determine its performance. The values of thresholds that result in best overall assignment accuracy are selected for use in production (or inference).

No biometric identifying information is used for matching the identified subject with the user account, and none is stored in support of this process. That is, there is no information in the sequences of images used to compare with stored biometric information for the purposes of matching the identified subjects with user accounts in support of this process. Thus, this logic to match the identified subjects with user accounts operates without use of personal identifying biometric information associated with the user accounts.

Network Ensemble

Figure 9A:
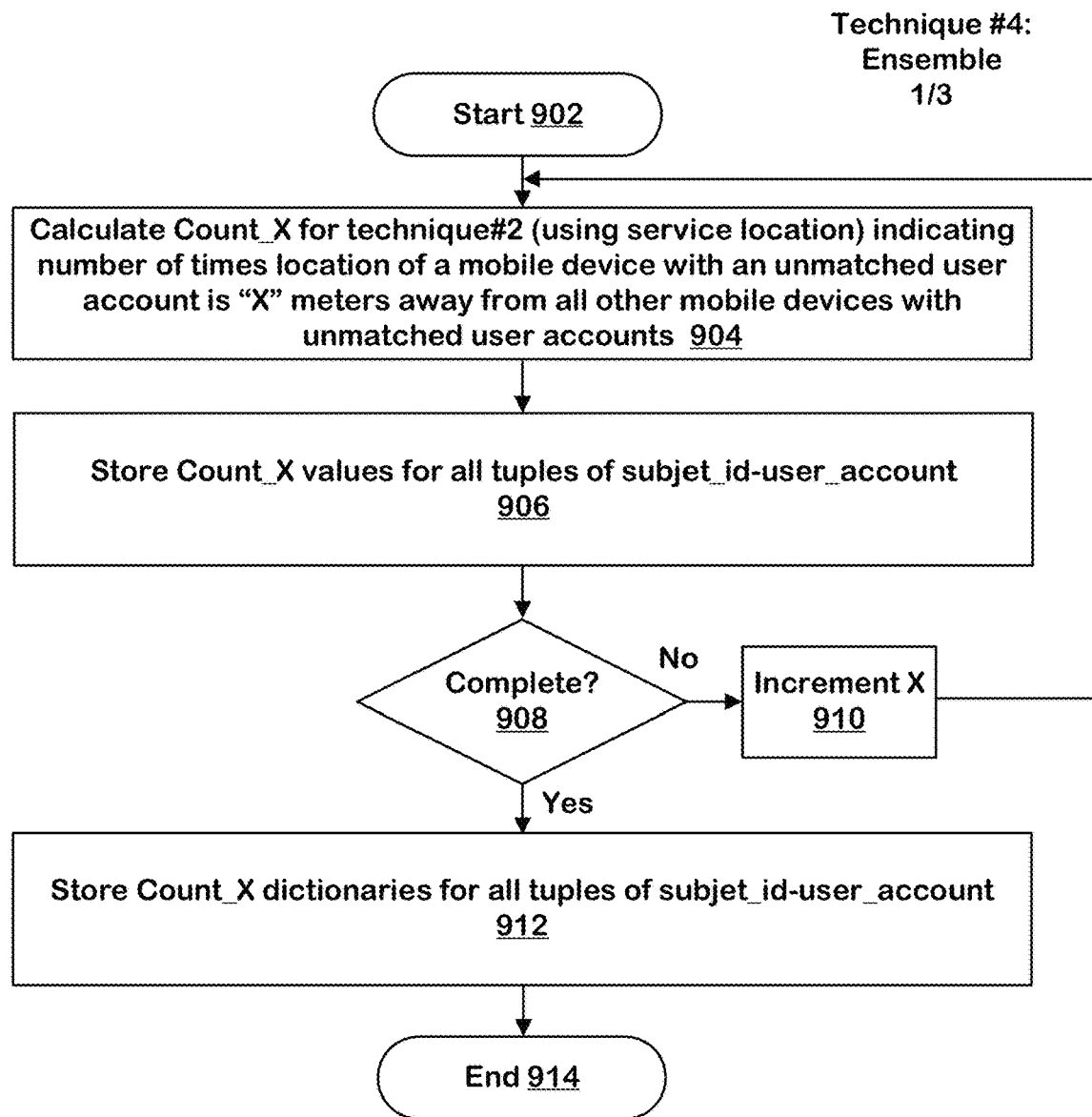
FIG. 9A is a flowchart showing a first part of process steps for matching an identified subject to a user account using a network ensemble.
Figure 9B:
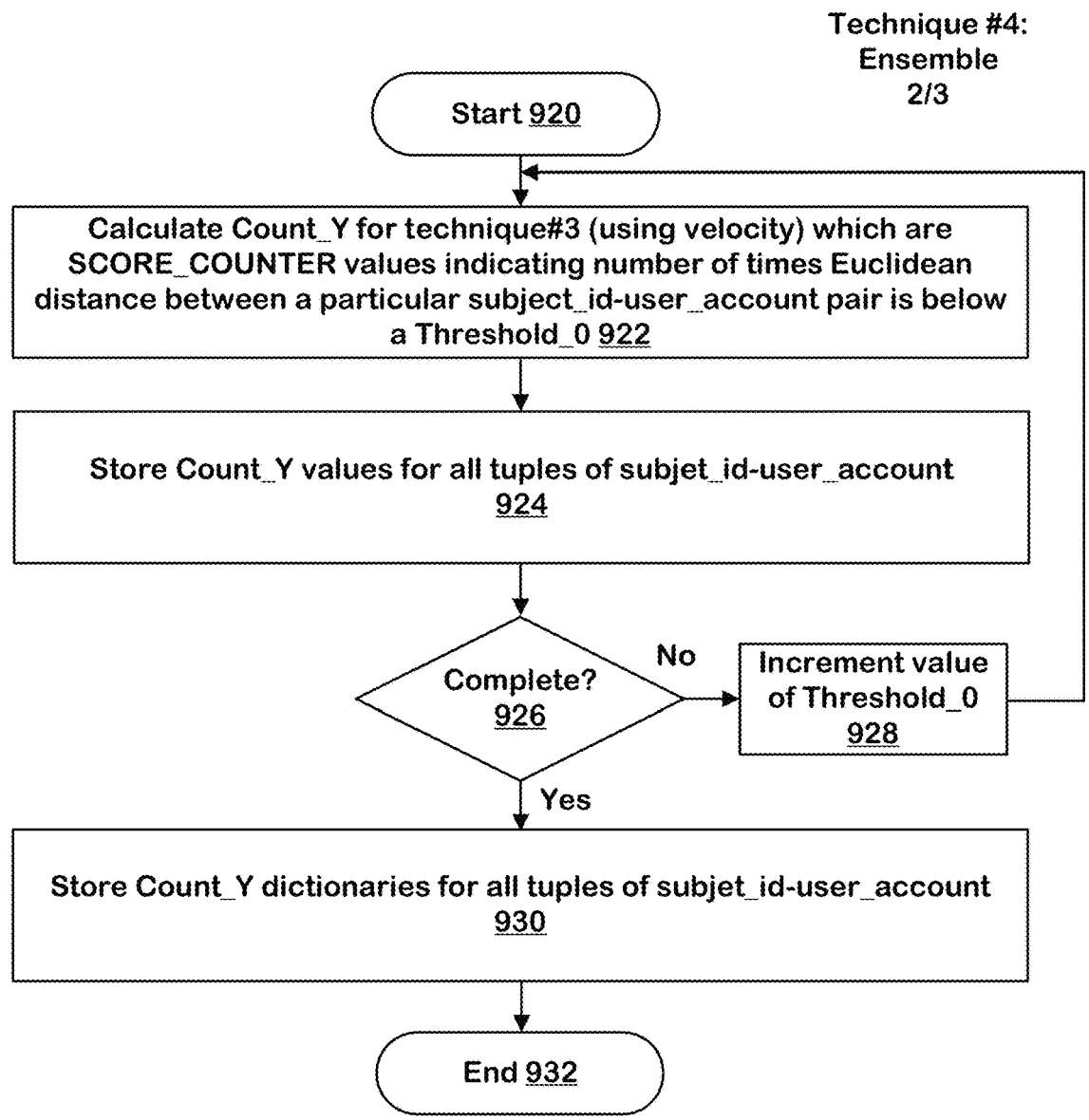
FIG. 9B is a flowchart showing a second part of process steps for matching an identified subject to a user account using a network ensemble.
Figure 9C:
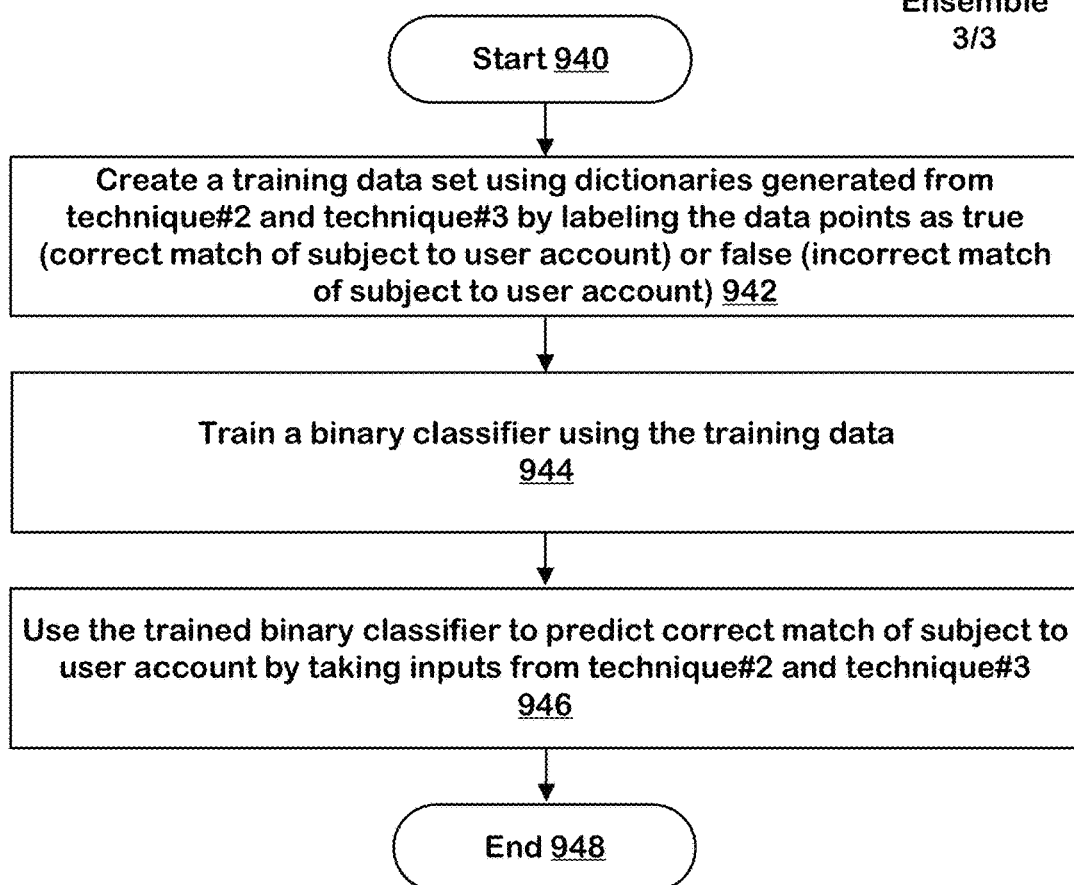
FIG. 9C is a flowchart showing a third part of process steps for matching an identified subject to a user account using a network ensemble.

A network ensemble is a learning paradigm where many networks are jointly used to solve a problem. Ensembles typically improve the prediction accuracy obtained from a single classifier by a factor that validates the effort and cost associated with learning multiple models. In the fourth technique to match user accounts to not yet linked identified subjects, the second and third techniques presented above are jointly used in an ensemble (or network ensemble). To use the two techniques in an ensemble, relevant features are extracted from application of the two techniques. FIGS. 9A-9C present process steps (in a flowchart 900) for extracting features, training the ensemble and using the trained ensemble to predict match of a user account to a not yet linked identified subject.

FIG. 9A presents the process steps for generating features using the second technique that uses service location of mobile computing devices. The process starts at step 902. At a step 904, a Count_X, for the second technique is calculated indicating a number of times a service location of a mobile computing device with an unmatched user account is X meters away from all other mobile computing devices with unmatched user accounts. At step 906, Count_X values of all tuples of subject_id-user_account pairs is stored by the system for use by the ensemble. In one embodiment, multiple values of X are used e.g., 1 m, 2 m, 3 m, 4 m, 5 m (steps 908 and 910). For each value of X, the count is stored as a dictionary that maps tuples of subject_id-user_account to count score, which is an integer. In the example where 5 values of X are used, five such dictionaries are created at step 912. The process ends at step 914.

FIG. 9B presents the process steps for generating features using the third technique that uses velocities of mobile computing devices. The process starts at step 920. At a step 922, a Count_Y, for the third technique is determined which is equal to score_counter values indicating number of times Euclidean distance between a particular subject_id-user_account pair is below a threshold_0. At a step 924, Count_Y values of all tuples of subject_id-user_account pairs is stored by the system for use by the ensemble. In one embodiment, multiple values of threshold_0 are used e.g., five different values (steps 926 and 928). For each value of threshold_0, the Count_Y is stored as a dictionary that maps tuples of subject_id-user_account to count score, which is an integer. In the example where 5 values of threshold are used, five such dictionaries are created at step 930. The process ends at step 932.

The features from the second and third techniques are then used to create a labeled training data set and used to train the network ensemble. To collect such a data set, multiple subjects (shoppers) walk in an area of real space such as a shopping store. The images of these subject are collected using cameras 114 at regular time intervals. Human labelers review the images and assign correct identifiers (subject_id and user_account) to the images in the training data. The process is described in a flowchart 900 presented in FIG. 9C. The process starts at a step 940. At a step 942, features in the form of Count_X and Count_Y dictionaries obtained from second and third techniques are compared with corresponding true labels assigned by the human labelers on the images to identify correct matches (true) and incorrect matches (false) of subject_id and user_account.

As we have only two categories of outcome for each mapping of subject_id and user_account: true or false, a binary classifier is trained using this training data set (step 944). Commonly used methods for binary classification include decision trees, random forest, neural networks, gradient boost, support vector machines, etc. A trained binary classifier is used to categorize new probabilistic observations as true or false. The trained binary classifier is used in production (or inference) by giving as input Count_X and Count_Y dictionaries for subject_id-user_account tuples. The trained binary classifier classifies each tuple as true or false at a step 946. The process ends at a step 948.

If there is an unmatched mobile computing device in the area of real space after application of the above four techniques, the system sends a notification to the mobile computing device to open the client application. If the user accepts the notification, the client application will display a semaphore image as described in the first technique. The system will then follow the steps in the first technique to check-in the shopper (match subject_id to user_account). If the customer does not respond to the notification, the system will send a notification to an employee in the shopping store indicating the location of the unmatched customer. The employee can then walk to the customer, ask him to open the client application on his mobile computing device to check-in to the system using a semaphore image.

No biometric identifying information is used for matching the identified subject with the user account, and none is stored in support of this process. That is, there is no information in the sequences of images used to compare with stored biometric information for the purposes of matching the identified subjects with user accounts in support of this process. Thus, this logic to match the identified subjects with user accounts operates without use of personal identifying biometric information associated with the user accounts.

Architecture

Figure 10:
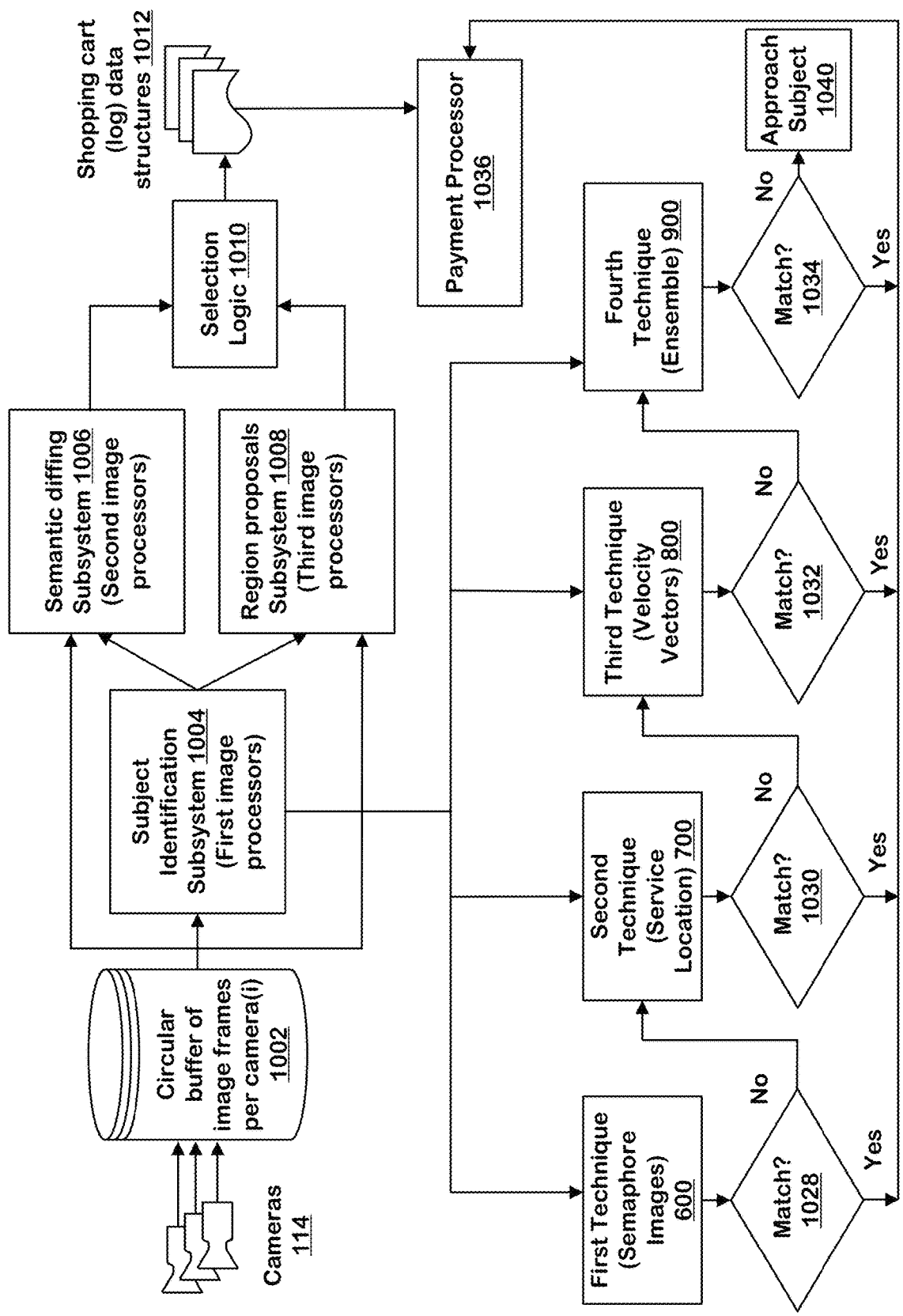
FIG. 10 is an example architecture in which the four techniques presented in FIGS. 6 to 9C are applied in an area of real space to reliably match an identified subject to a user account.

An example architecture of a system in which the four techniques presented above are applied to match a user_account to a not yet linked subject in an area of real space is presented in FIG. 10. Because FIG. 10 is an architectural diagram, certain details are omitted to improve the clarity of description. The system presented in FIG. 10 receives image frames from a plurality of cameras 114. As described above, in one embodiment, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 1002.

A "subject identification" subsystem 1004 (also referred to as first image processors) processes image frames received from cameras 114 to identify and track subjects in the real space. The first image processors include subject image recognition engines such as the JointsCNN above.

A "semantic diffing" subsystem 1006 (also referred to as second image processors) includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject identification subsystem 1004 and image frames from cameras 114 as input. Details of "semantic diffing" subsystem are presented in U.S. patent application Ser. No. 15/945,466, filed 4 Apr. 2018, titled, "Predicting Inventory Events using Semantic Diffing," and U.S. patent application Ser. No. 15/945,473, filed 4 Apr. 2018, titled, "Predicting Inventory Events using Foreground/Background Processing," both of which are incorporated herein by reference as if fully set forth herein. The second image processors process identified background changes to make a first set of detections of takes of inventory items by identified subjects and of puts of inventory items on inventory display structures by identified subjects. The first set of detections are also referred to as background detections of puts and takes of inventory items. In the example of a shopping store, the first detections identify inventory items taken from the shelves or put on the shelves by customers or employees of the store. The semantic diffing subsystem includes the logic to associate identified background changes with identified subjects.

A "region proposals" subsystem 1008 (also referred to as third image processors) includes foreground image recognition engines, receives corresponding sequences of images from the plurality of cameras 114, and recognizes semantically significant objects in the foreground (i.e. shoppers, their hands and inventory items) as they relate to puts and takes of inventory items, for example, over time in the images from each camera. The region proposals subsystem 1008 also receives output of the subject identification subsystem 1004. The third image processors process sequences of images from cameras 114 to identify and classify foreground changes represented in the images in the corresponding sequences of images. The third image processors process identified foreground changes to make a second set of detections of takes of inventory items by identified subjects and of puts of inventory items on inventory display structures by identified subjects. The second set of detections are also referred to as foreground detection of puts and takes of inventory items. In the example of a shopping store, the second set of detections identifies takes of inventory items and puts of inventory items on inventory display structures by customers and employees of the store. The details of a region proposal subsystem are presented in U.S. patent application Ser. No. 15/907,112, filed 27 Feb. 2018, titled, "Item Put and Take Detection Using Image Recognition" which is incorporated herein by reference as if fully set forth herein.

The system described in FIG. 10 includes a selection logic 1010 to process the first and second sets of detections to generate log data structures including lists of inventory items for identified subjects. For a take or put in the real space, the selection logic 1010 selects the output from either the semantic diffing subsystem 1006 or the region proposals subsystem 1008. In one embodiment, the selection logic 1010 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1012 (also referred to as a shopping cart data structure) including a list of inventory items (and their quantities) associated with identified subjects.

To process a payment for the items in the log data structure 1012, the system in FIG. 10 applies the four techniques for matching the identified subject (associated with the log data) to a user_account which includes a payment method such as credit card or bank account information. In one embodiment, the four techniques are applied sequentially as shown in the figure. If the process steps in flowchart 600 for the first technique produces a match between the subject and the user account then this information is used by a payment processor 1036 to charge the customer for the inventory items in the log data structure. Otherwise (step 1028), the process steps presented in flowchart 700 for the second technique are followed and the user account is used by the payment processor 1036. If the second technique is unable to match the user account with a subject (1030) then the process steps presented in flowchart 800 for the third technique are followed. If the third technique is unable to match the user account with a subject (1032) then the process steps in flowchart 900 for the fourth technique are followed to match the user account with a subject.

If the fourth technique is unable to match the user account with a subject (1034), the system sends a notification to the mobile computing device to open the client application and follow the steps presented in the flowchart 600 for the first technique. If the customer does not respond to the notification, the system will send a notification to an employee in the shopping store indicating the location of the unmatched customer. The employee can then walk to the customer, ask him to open the client application on his mobile computing device to check-in to the system using a semaphore image (step 1040). It is understood that in other embodiments of the architecture presented in FIG. 10, fewer than four techniques can be used to match the user accounts to not yet linked identified subjects.

Network Configuration

Figure 11:
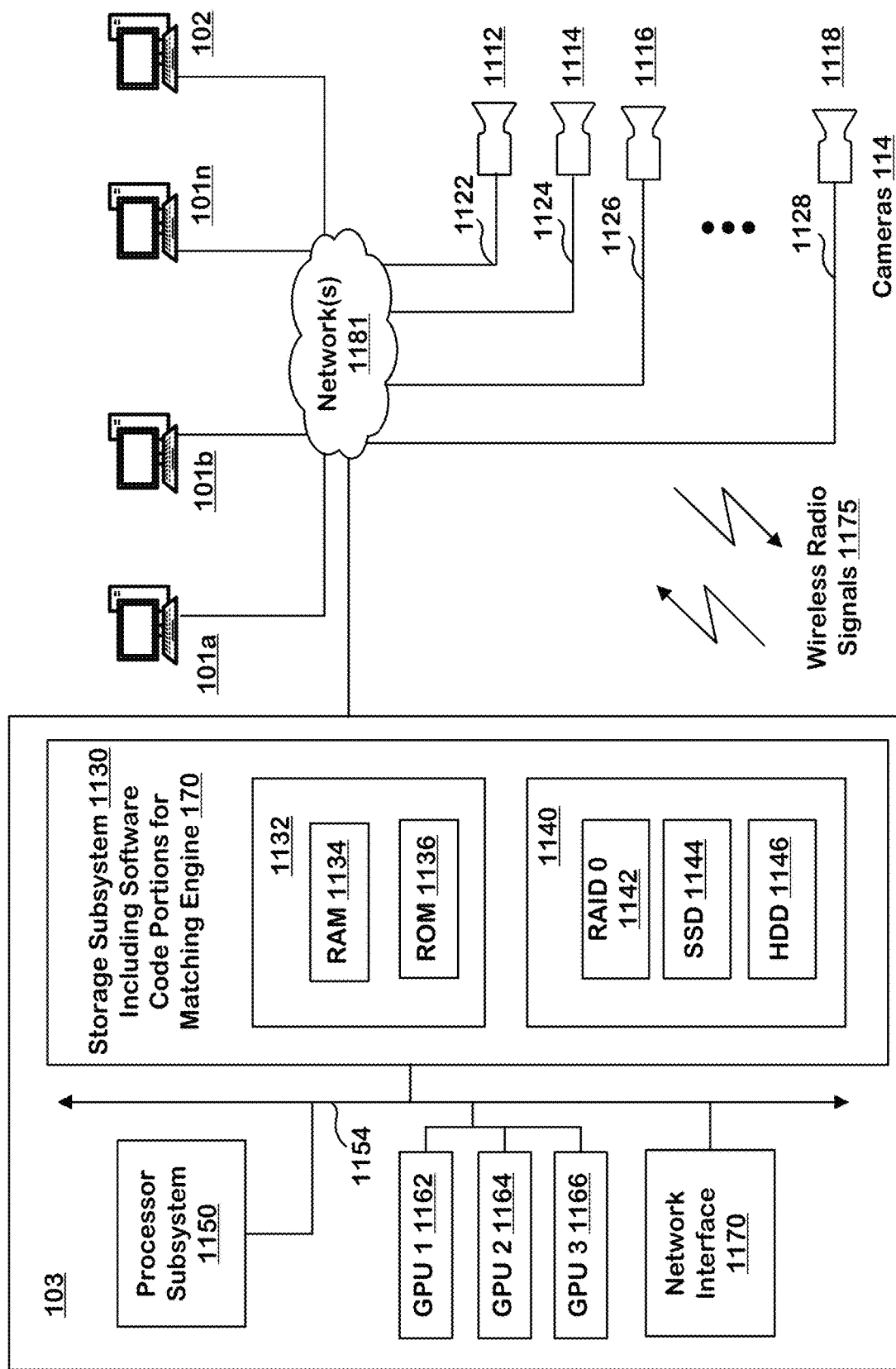
FIG. 11 is a camera and computer hardware arrangement configured for hosting the matching engine of FIG. 1.

FIG. 11 presents an architecture of a network hosting the matching engine 170 which is hosted on the network node 103. The system includes a plurality of network nodes 103, 101*a*-101*n*, and 102 in the illustrated embodiment. In such an embodiment, the network nodes are also referred to as processing platforms. Processing platforms (network nodes) 103, 101*a*-101*n*, and 102 and cameras 1112, 1114, 1116, . . . 1118 are connected to network(s) 1181.

FIG. 11 shows a plurality of cameras 1112, 1114, 1116, . . . 1118 connected to the network(s). A large number of cameras can be deployed in particular systems. In one embodiment, the cameras 1112 to 1118 are connected to the network(s) 1181 using Ethernet-based connectors 1122, 1124, 1126, and 1128, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1130 stores the basic programming and data constructs that provide the functionality of certain embodiments of the present invention. For example, the various modules implementing the functionality of the matching engine 170 may be stored in storage subsystem 1130. The storage subsystem 1130 is an example of a computer readable memory comprising a non-transitory data storage medium, having computer instructions stored in the memory executable by a computer to perform all or any combination of the data processing and image processing functions described herein, including logic to link subjects in an area of real space with a user account, to determine locations of identified subjects represented in the images, match the identified subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 1150. A host memory subsystem 1132 typically includes a number of memories including a main random access memory (RAM) 1134 for storage of instructions and data during program execution and a read-only memory (ROM) 1136 in which fixed instructions are stored. In one embodiment, the RAM 1134 is used as a buffer for storing subject_id-user_account tuples matched by the matching engine 170.

A file storage subsystem 1140 provides persistent storage for program and data files. In an example embodiment, the storage subsystem 1140 includes four 120 Gigabyte (GB) solid state disks (SSD) in a RAID 0 (redundant array of independent disks) arrangement identified by a numeral 1142. In the example embodiment, user account data in the user account database 150 and image data in the image database 160 which is not in RAM is stored in RAID 0. In the example embodiment, the hard disk drive (HDD) 1146 is slower in access speed than the RAID 0 1142 storage. The solid state disk (SSD) 1144 contains the operating system and related files for the matching engine 170.

In an example configuration, three cameras 1112, 1114, and 1116, are connected to the processing platform (network node) 103. Each camera has a dedicated graphics processing unit GPU 1 1162, GPU 2 1164, and GPU 3 1166, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1150, the storage subsystem 1130 and the GPUs 1162, 1164, and 1166 communicate using the bus subsystem 1154.

A network interface subsystem 1170 is connected to the bus subsystem 1154 forming part of the processing platform (network node) 103. Network interface subsystem 1170 provides an interface to outside networks, including an interface to corresponding interface devices in other computer systems. The network interface subsystem 1170 allows the processing platform to communicate over the network either by using cables (or wires) or wirelessly. The wireless radio signals 1175 emitted by the mobile computing devices 120 in the area of real space are received (via the wireless access points) by the network interface subsystem 1170 for processing by the matching engine 170. A number of peripheral devices such as user interface output devices and user interface input devices are also connected to the bus subsystem 1154 forming part of the processing platform (network node) 103. These subsystems and devices are intentionally not shown in FIG. 11 to improve the clarity of the description. Although bus subsystem 1154 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300–∞, a field of view field of view with a ⅓" sensor of 98.2°-23.8°.

Particular Implementations

In various embodiments, the system for linking subjects in an area of real space with user accounts described above also includes one or more of the following features.

The system includes a plurality of cameras, cameras in the plurality of cameras producing respective sequences of images in corresponding fields of view in the real space. The processing system is coupled to the plurality of cameras, the processing system includes logic to determine locations of identified subjects represented in the images. The system matches the identified subjects with user accounts by identifying locations of mobile devices executing client applications in the area of real space, and matches locations of the mobile devices with locations of the subjects.

In one embodiment, the system the signals emitted by the mobile computing devices comprise images.

In one embodiment, the signals emitted by the mobile computing devices comprise radio signals.

In one embodiment, the system includes a set of semaphore images accessible to the processing system. The processing system includes logic to accept login communications from a client application on a mobile computing device identifying a user account before matching the user account to an identified subject in the area of real space, and after accepting login communications the system sends a selected semaphore image from the set of semaphore images to the client application on the mobile device.

In one such embodiment, the processing system sets a status of the selected semaphore image as assigned. The processing system receives a displayed image of the selected semaphore image. The processing system recognizes the displayed image and matches the recognized semaphore image with the assigned images from the set of semaphore images. The processing system matches a location of the mobile computing device displaying the recognized semaphore image located in the area of real space with a not yet linked identified subject. The processing system, after matching the user account to the identified subject, sets the status of the recognized semaphore image as available.

In one embodiment, the client applications on the mobile computing devices transmit accelerometer data to the processing system, and the system matches the identified subjects with user accounts using the accelerometer data transmitted from the mobile computing devices.

In one such embodiment, the logic to match the identified subjects with user accounts includes logic that uses the accelerometer data transmitted from the mobile computing device from a plurality of locations over a time interval in the area of real space and a derivative of data indicating the locations of identified subjects over the time interval in the area of real space.

In one embodiment, the signals emitted by the mobile computing devices include location data and accelerometer data.

In one embodiment, the signals emitted by the mobile computing devices comprise images.

In one embodiment, the signals emitted by the mobile computing devices comprise radio signals.

A method of linking subjects in an area of real space with user accounts is disclosed. The user accounts are linked with client applications executable on mobile computing devices is disclosed. The method includes, using a plurality of cameras to produce respective sequences of images in corresponding fields of view in the real space. Then the method includes determining locations of identified subjects represented in the images. The method includes matching the identified subjects with user accounts by identifying locations of mobile computing devices executing client applications in the area of real space. Finally, the method includes matching locations of the mobile computing devices with locations of the subjects.

In one embodiment, the method also includes, setting a status of the selected semaphore image as assigned, receiving a displayed image of the selected semaphore image, recognizing the displayed semaphore image and matching the recognized image with the assigned images from the set of semaphore images. The method includes, matching a location of the mobile computing device displaying the recognized semaphore image located in the area of real space with a not yet linked identified subject. Finally, the method includes after matching the user account to the identified subject setting the status of the recognized semaphore image as available.

In one embodiment, matching the identified subjects with user accounts further includes using the accelerometer data transmitted from the mobile computing device from a plurality of locations over a time interval in the area of real space. A derivative of data indicating the locations of identified subjects over the time interval in the area of real space.

In one embodiment, the signals emitted by the mobile computing devices include location data and accelerometer data.

In one embodiment, the signals emitted by the mobile computing devices comprise images.

In one embodiment, the signals emitted by the mobile computing devices comprise radio signals.

A non-transitory computer readable storage medium impressed with computer program instructions to link subjects in an area of real space with user accounts is disclosed. The user accounts are linked with client applications executable on mobile computing devices, the instructions, when executed on a processor, implement a method. The method includes using a plurality of cameras to produce respective sequences of images in corresponding fields of view in the real space. The method includes determining locations of identified subjects represented in the images. The method includes matching the identified subjects with user accounts by identifying locations of mobile computing devices executing client applications in the area of real space. Finally, the method includes matching locations of the mobile computing devices with locations of the subjects.

In one embodiment, the non-transitory computer readable storage medium implements the method further comprising the following steps. The method includes setting a status of the selected semaphore image as assigned, receiving a displayed image of the selected semaphore image, recognizing the displayed semaphore image and matching the recognized image with the assigned images from the set of semaphore images. The method includes matching a location of the mobile computing device displaying the recognized semaphore image located in the area of real space with a not yet linked identified subject. After matching the user account to the identified subject setting the status of the recognized semaphore image as available.

In one embodiment, the non-transitory computer readable storage medium implements the method including matching the identified subjects with user accounts by using the accelerometer data transmitted from the mobile computing device from a plurality of locations over a time interval in the area of real space and a derivative of data indicating the locations of identified subjects over the time interval in the area of real space.

In one embodiment, the signals emitted by the mobile computing devices include location data and accelerometer data.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for linking a subject in an area of real space with a user account, the method comprising:
performing a match by matching a mobile computing device of one or more mobile computing devices with a subject, the match being performed in dependence on a comparison of a determined velocity of the subject and determined velocities of the one or more mobile computing devices; and
linking, in dependence on the performed match, the subject with a user account corresponding to one mobile computing device of the mobile computing devices matched by the performed match.

2. The method of claim 1, further comprising determining the velocities of the one or more mobile computing devices by implementing operations including:
receiving first accelerometer data from a first mobile computing device of the one or more mobile computing devices, the first accelerometer data indicative of acceleration of the first mobile computing device along one or more axes;
using the accelerometer data from the first mobile computing device over a plurality of time intervals to determine a corresponding plurality of velocities of the first mobile computing device over the plurality of time intervals; and
determining an average velocity of the first mobile computing device over the plurality of time intervals, based on the plurality of velocities.

3. The method of claim 1, further comprising determining the velocity of the subject by implementing operations including:
determining a change in a position of a joint of the subject with respect to time in a sequence of images of the area of real space, wherein the subject is identified within the sequence of images;
determining a location of a center of mass of the subject, based on the joint of the subject; and
determining a velocity of the center of mass of the subject, based on the change in the position of the joint of the subject with respect to time.

4. The method of claim 1, further comprising determining the velocity of the subject by implementing operations including:
determining a velocity of a hand of the subject holding a mobile computing device.

5. The method of claim 1, wherein the performing of the match includes:
determining Euclidean distances between velocities of the one or more mobile computing devices and the subject; and
in response to a Euclidean distance between a velocity of a particular mobile computing device and the subject being less than a threshold, matching the particular mobile computing device with the subject.

6. The method of claim 1, wherein the performing of the match includes:
determining Euclidean distances between velocities of various pairs of mobile computing devices and the subject, such that a plurality of Euclidean distances are determined corresponding to a plurality of pairs of mobile computing devices and the subject, each pair including (i) a corresponding mobile computing device of the one or more mobile computing devices that have not yet been linked to the subject and (ii) the subject that has not yet been linked to a corresponding one or more mobile computing device;
for each pair of the plurality of pairs, incrementing a score counter in response to a corresponding Euclidean distance associated with the pair being below a first threshold, such that a plurality of score counters corresponding to the plurality of pairs is maintained and selectively incremented;
comparing individual score counters with a second threshold, and selecting (i) a highest-score counter with a highest score above the second threshold and (ii) a second-highest score counter with a second highest score, wherein the highest-score counter is for a first pair that includes a first mobile computing device and the subject; and
in response to a difference between the highest-score counter for the first pair and the second- highest score counter being higher than a third threshold, matching the first mobile computing device with the subject.

7. The method of claim 6, wherein the performing of the match further comprises incrementing a score counter for a pair of the mobile computing device and the subject when the distance between the velocity of the mobile computing device and the velocity of the subject is below a first threshold.

8. The method of claim 7, further including:
comparing score counters for multiple pairs of mobile computing devices the subject with a second threshold and selecting a score counter with a highest score above the second threshold;
comparing the score of the selected score counter with a score of a score counter with a second highest score; and
matching a pair of a mobile computing device and the subject with the selected score counter when a difference between the scores of the selected score counter and the score of the score counter with the second highest score is above a third threshold.

9. The method of claim 8, further including using a trained neural network to predict the first threshold, the second threshold and the third threshold.

10. The method of claim 6, further including calculating the velocity of the subject from a change in a center of mass of the subject over time, wherein the center of mass of the subject is determined from a location of a joint of the subjects.

11. The method of claim 6, further including processing a plurality of sequences of images to determine a hand joint of the subject holding the mobile computing device and calculating a velocity of the hand joint over time.

12. A non-transitory computer readable storage medium impressed with computer program instructions to link a subject in an area of real space with a user account, the instructions, when executed on a processor, implement a method comprising:
performing a match by matching a mobile computing device of one or more mobile computing devices with a subject, the match being performed in dependence on a comparison of a determined velocity of the subject and determined velocities of the one or more mobile computing devices; and
linking, in dependence on the performed match, the subject with a user account corresponding to one mobile computing device of the mobile computing devices matched by the performed match.

13. The non-transitory computer readable storage medium of claim 12, wherein the method further comprises:
receiving sensor data from the area of real space, wherein the sensor data comprises one or more sequences of image data respectively generated by one or more cameras;
determining velocities of one or more subjects, based on the sensor data;
determining velocities of the one or more mobile computing devices in the area of real space, based on data transmitted by the one or more mobile computing devices;
determining a norm between (i) a velocity of a first mobile computing device of the one or more mobile computing devices and (ii) a velocity of a first subject of the one or more subjects; and
in response to the norm being less than a threshold, linking the first subject with a first user account linked to a first client application being executed on the first mobile device.

14. The non-transitory computer readable storage medium of claim 12, wherein the method further comprises determining the velocities of the one or more mobile computing devices by implementing operations including:
receiving first accelerometer data from a first mobile computing device of the one or more mobile computing devices, the first accelerometer data indicative of acceleration of the first mobile computing device along one or more axes;
using the first accelerometer data from the first mobile computing device over a plurality of time intervals to determine a corresponding plurality of velocities of the first mobile computing device over the plurality of time intervals; and
determining an average velocity of the first mobile computing device over the plurality of time intervals, based on the plurality of velocities.

15. The non-transitory computer readable storage medium of claim 12, wherein the method further comprises determining the velocity of the subject by implementing operations including:
determining a change in a position of a joint of the subject with respect to time in a sequence of images of the area of real space, wherein the subject is identified within the sequence of images;
determining a location of a center of mass of the subject, based on the joint of the subject; and
determining a velocity of the center of mass of the subject, based on the change in the position of the joint of the subject with respect to time.

16. A system including one or more processors coupled to memory, the memory storing computer instructions for linking a subject in an area of real space with a user account, the computer instructions, when executed on the one or more processors, causing the one or more processors to implement actions comprising:
performing a match by matching a mobile computing device of one or more mobile computing devices with the subject, the match being performed in dependence on a comparison of a determined velocity of a subject and determined velocities of the one or more mobile computing devices; and
linking, in dependence on the performed match, the subject with a user account corresponding to one mobile computing device of the mobile computing devices matched by the performed match.

17. The system of claim 16, wherein the actions further comprise determining the velocities of the one or more mobile computing devices by implementing operations including:
receiving first accelerometer data from a first mobile computing device of the one or more mobile computing devices, the first accelerometer data indicative of acceleration of the first mobile computing device along one or more axes;
using the first accelerometer data from the first mobile computing device over a plurality of time intervals to determine a corresponding plurality of velocities of the first mobile computing device over the plurality of time intervals; and
determining an average velocity of the first mobile computing device over the plurality of time intervals, based on the plurality of velocities.

18. The system of claim 16, wherein the actions further comprise determining the velocity of the subject by implementing operations including:
determining a change in a position of a joint of the subject with respect to time in a sequence of images of the area of real space, wherein the subject is identified within the sequence of images;
determining a location of a center of mass of the subject, based on the joint of the subject; and determining a velocity of the center of mass of the subject, based on the change in the position of the joint of the subject with respect to time.

19. The system of claim 16, wherein the actions further comprise determining the velocity of the subject by implementing operations including:

determining a velocity of a hand of the subject holding a mobile computing device.

\* \* \* \* \*